(12) United States Patent
Long et al.

(10) Patent No.: US 12,587,524 B2
(45) Date of Patent: Mar. 24, 2026

(54) AUTHENTICATION SYSTEM AND METHOD FOR WINDOWS SYSTEMS

(71) Applicant: Traitware Inc., Reno, NV (US)

(72) Inventors: Jeffrey Long, Reno, NV (US); Christopher Canfield, Santa Clarita, CA (US); Herbert W. Spencer, III, Grass Valley, CA (US)

(73) Assignee: Traitware, Inc., Reno, NV (US)

( * ) Notice: Subject to any disclaimer, the term of this patent is extended or adjusted under 35 U.S.C. 154(b) by 136 days.

(21) Appl. No.: 18/506,106

(22) Filed: Nov. 9, 2023

(65) Prior Publication Data

US 2024/0154956 A1     May 9, 2024

Related U.S. Application Data

(60) Provisional application No. 63/383,068, filed on Nov. 9, 2022.

(51) Int. Cl.
*H04L 9/40*          (2022.01)
(52) U.S. Cl.
CPC ........ *H04L 63/0838* (2013.01); *H04L 63/062* (2013.01); *H04L 63/0853* (2013.01); *H04L 2463/082* (2013.01)

(58) Field of Classification Search
CPC ......... H04L 9/321–3213; H04L 63/062; H04L 63/083–0846; H04L 63/0853; H04L 63/18; H04L 2463/082
See application file for complete search history.

(56) References Cited

U.S. PATENT DOCUMENTS

| | | | | |
|---|---|---|---|---|
| 6,108,779 A | * | 8/2000 | Dean ..................... | G06F 9/4416 726/13 |
| 2014/0365780 A1 | * | 12/2014 | Movassaghi .......... | H04L 9/3228 713/184 |
| 2021/0004454 A1 | * | 1/2021 | Chester ................. | H04L 9/3213 |
| 2021/0176059 A1 | * | 6/2021 | Hertrich ............... | H04L 9/3271 |

\* cited by examiner

*Primary Examiner* — Kevin Bechtel
(74) *Attorney, Agent, or Firm* — Kari L. Barnes, P.C.

(57) ABSTRACT

Exemplary embodiments of the process of remotely accessing a first device may include: connecting the first device to an authentication server; generating a one time code; transferring the one time code to a second device; connecting the second device to the authentication server; sending the one time code from the second device to the authentication server; confirming the one time code with the authentication server; modifying the first device to exclusively use only one credential provider to authenticate a user; communicating approval for authentication of the user from the authentication server to the first device when the one time code is confirmed with the authentication server; and singing the user into the first device after the approval for authentication of the user is communicated to the first device.

6 Claims, 12 Drawing Sheets

Applications
Application Active Type Add/Remove
App 1       Yes    SAML
App 2       Yes    OIDC
App 3       Yes    SAML Add All Users to This Application
Search First   Last   E-Mail     App Access

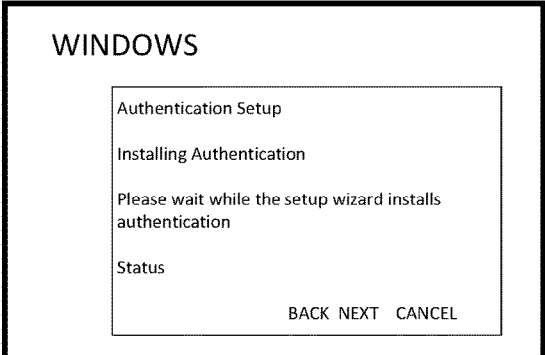

WINDOWS

Authentication Setup

Installing Authentication

Please wait while the setup wizard installs authentication

Status

BACK  NEXT  CANCEL

FIG. 24

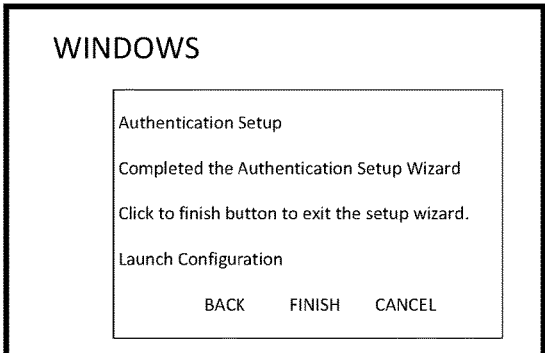

WINDOWS

Authentication Setup

Completed the Authentication Setup Wizard

Click to finish button to exit the setup wizard.

Launch Configuration

BACK     FINISH     CANCEL

FIG. 25

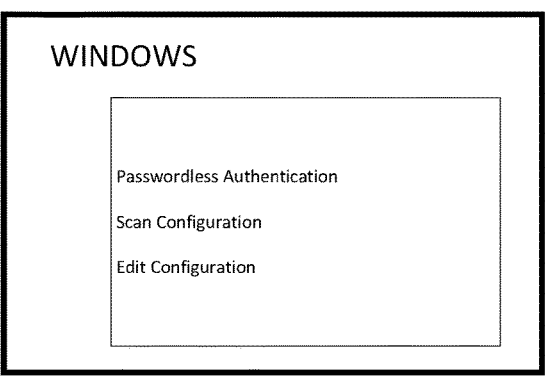

WINDOWS

Passwordless Authentication

Scan Configuration

Edit Configuration

FIG. 26

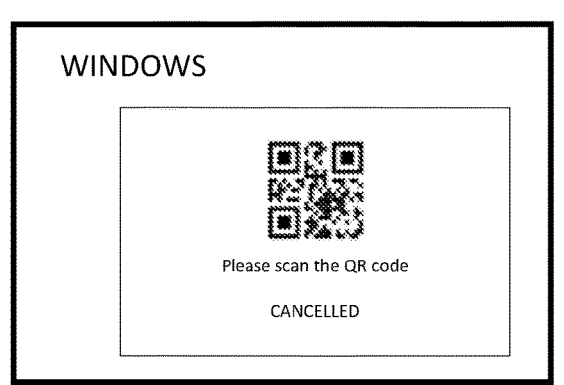

WINDOWS

Please scan the QR code

CANCELLED

FIG. 27

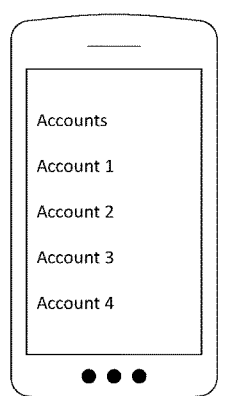

Accounts

Account 1

Account 2

Account 3

Account 4

FIG. 28

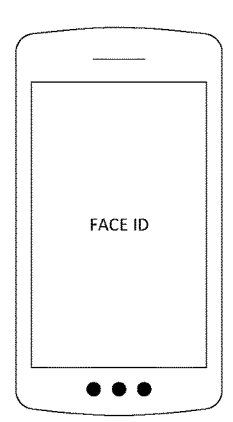

FACE ID

FIG. 29

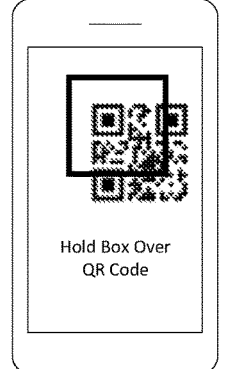

Hold Box Over
QR Code

FIG. 30

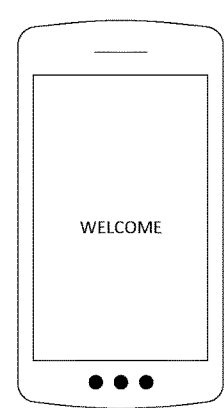

WELCOME

FIG. 31

AUTHENTICATION SYSTEM AND METHOD FOR WINDOWS SYSTEMS

PRIORITY

The instant application claims priority to U.S. Provisional Patent Application 63/383,068, filed Nov. 9, 2022, which is incorporated by reference in its entirety herein.

BACKGROUND

Microsoft's Windows application permits multi-factor authentication, called WindowsMFA. WindowsMFA allows for passwordless multi-factor authentication directly into a device using Microsoft Windows operating systems. Currently Microsoft does not provide remote desktop multi-factor authentication. Therefore, remote access to computers, particularly to servers using Microsoft remote desktop, has vulnerabilities because a password is primarily used for access.

Given the configuration of the Windows system, providing a remote authentication system that permits logging into a Windows machine that works with WindowsMFA is difficult. Therefore, there is no known multi-factor authentication system or method that is currently available to a remote windows server. Applicant of the instant application has a patent application pending for SSH multi-factor authentication to Linux machines and other devices that can use a pluggable authentication module. International Patent Publication WO2021/041566 is incorporated herein by reference in its entirety. However, there is a need for a multi-factor authentication solution for remotely accessing a machine running a Microsoft Windows operating system.

SUMMARY

By installing embodiments of the multi-factor authentication system described herein, remote access to a Windows machine may be provided to a Windows machine.

Exemplary embodiments described herein may provide systems and processes for providing multi-factor authentication to a Windows machine used in combination or in place of WindowsMFA. Exemplary embodiments may therefore be used to provide alternative or improved authentication to a Windows machine, either for direct log in or remote access through another electronic device.

Exemplary systems described herein may employ exemplary methods according to embodiments described herein. The systems and methods may incorporate registry key modification of a Windows operating system machine so that access to local and remote machine may be limited to a single credential provider that is installed to handle the specific remote authentication process. The systems and methods may use a single credential provider at the machine operating a Windows operating system in which the user wishes to remotely access. The system may include software stored at the machine in which the user wishes to obtain access (either directly or remotely) to modify the registry key of the Windows operating system machine to use the single credential provider, provide a unique identifier, and receive an authentication from an authentication server. The system and methods may also include an application stored on an electronic device that has been registered to the user. The application may be used to receive the unique identifier and communicate the unique identifier to the communication server. The communication server may be able to receive the unique identifier from the electronic device and confirm the authentication of the received unique identifier and communicate a login request to the machine operating the Windows operating system in which the user wished to remotely access.

DRAWINGS

FIG. 8 to FIG. 31 illustrates exemplary screen displays according to exemplary embodiments described herein.

DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention and are not limiting of the present invention nor are they necessarily drawn to scale.

Exemplary embodiments described herein provide for access to a Microsoft machine. Exemplary embodiments of the systems and methods described herein are configured to set the registry keys in a Window machine as described herein so that the Windows authentication logon can be set to use a secure method that provides a passwordless multi-factor authentication process that secures the remote login. In an optional configuration, the logon to the machine can be forced to display a QR code representing a one-time passcode that can be read by an application on the user's possessed device and communicated to an authentication server to verify the authentication. Exemplary embodiments described herein may be configured for direct access to a Microsoft machine or for remote access to another device.

Exemplary embodiments described herein include processes of remotely accessing a remote device (a first device). Exemplary embodiments may include machine readable instructions stored on one or more memory that when executed by one or more processors are configured to perform the processes described herein. The instructions may be stored between a personal electronic device (a second device) of a user, an authentication device (authentication server), a device to be accessed by a user (the first device, a remote device, a third device), another server, or a combination thereof.

Figure 1:
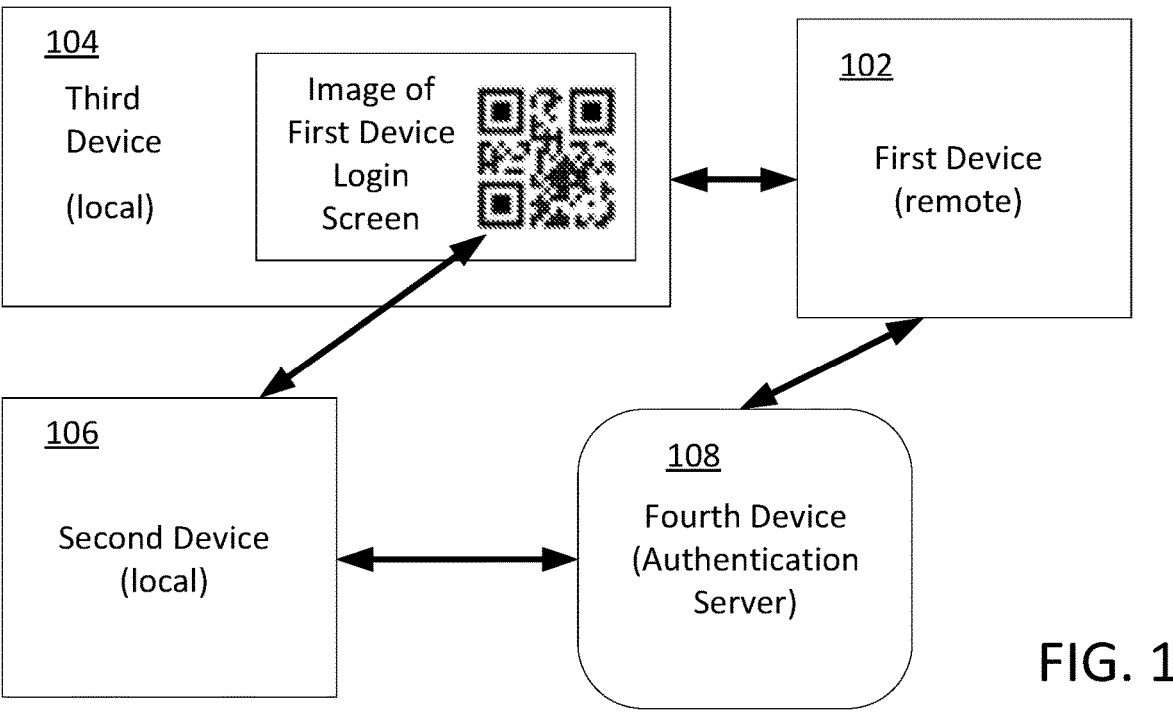
FIG. 1 illustrates an exemplary embodiment in which a user desires to access a first device remotely from a third device. The system uses an authentication server (fourth device) as described herein to confirm that access is permitted through information received from a second device, where each of the first, second, third, and fourth devices are separate electronic devices.

FIG. 1 illustrates an exemplary embodiment in which a user desires to access a first device 102 remotely from a third device 104. The system uses an authentication server (fourth device) 108 as described herein to confirm that access is permitted through information received from a second device 106, where each of the first, second, third, and fourth devices are separate electronic devices.

Exemplary embodiments of the process of remotely accessing a first device 102 may include: connecting the first device 102 to an authentication server 108; generating a one time code; transferring the one time code to a second device 106; connecting the second device 106 to the authentication server 108; sending the one time code from the second device 106 to the authentication server 108; confirming the one time code with the authentication server 108; modifying the first device 102 to exclusively use only one credential provider to authenticate a user; communicating approval for authentication of the user from the authentication server 108 to the first device 102 when the one time code is confirmed with the authentication server; and signing the user into the first device 102 from the third device 104 after the approval for authentication of the user is communicated to the first device.

The second device 106 may be an electronic device of the user. In an exemplary embodiment, the second device may be a smart phone, tablet, laptop, or other electronic device of the user. In an exemplary embodiment, the second device 106 may have stored on memory therein instructions that when executed by the processor of the second device are configured to receive images. In an exemplary embodiment, the second device comprises a camera and the images are from the camera. In an exemplary embodiment, the one time code is contained in an image and the image, with the one time code, is configured to be transferred to the second device by receiving an image of the second device through the camera of the second device communicated to the application of the second device. In an exemplary embodiment, the application is configured to securely communicate with the authentication server. The application may be configured to send the one time code through the secure connection. Other configurations of receiving the one time code at the second device are also contemplated herein. For example, a wired or wireless connection may be created between the second device and the third device. For example, the second device may be coupled to the third device through Bluetooth, near field communication (NFC), wifi, etc. The one time code may be transmitted to the second device from the third device through the wired or wireless communication between the devices. The one time code may also be typed by the user in a user interface of the second device. The one time code may also be received in other configurations, such as other visuals, gestures, user inputs, etc.

In an exemplary embodiment, the second device may have stored thereon an application. The application may be configured to be executed by the processor of the second device. The application may be configured with optional features. For example, the application may be configured to permit access to a user after a credential is verified. In an exemplary embodiment, the credential may be, for example, a password, knowledge factor, pin code, biometric factor, etc., or a combination thereof. In an optional embodiment, the second device may be configured through the application to authenticate the user to the application before the application is accessed by the user. When the application is accessed by the user, the application may provide a user interface to the user. When the application is accessed by the user, the application may be configured to create a secure connection between the second device and the authentication server. In an optional embodiment, the application may be configured to receive a user input through the user interface. In an optional embodiment, the user input may be a selection of a remote system to connect. For example, the user may select the first device to access for remote connection. The selection of a device for connection may permit the system to connect to the correct authentication server and/or the first device, and/or the second device, and/or another server, and/or third device, and/or make the correct connections therebetween.

In an optional embodiment, the second device may be registered with the authentication server prior to the use of the application and the second device to remotely access the first device. The second device may be reauthenticated based on the registration of the second device at the time of remotely accessing the first device. The registration of the second device may include providing user credentials, device credentials, or other authentication information that may be stored at the authentication server. When making the secure connection between the second device and the authentication server, the user credentials, device credentials, or other authentication information may be sent from the second device to the authentication server to authenticate the device to the authentication server.

In an exemplary embodiment, the first device 102 is remotely accessed by a third device 104. The third device 104 is configured to communicate with the first device 102. In an exemplary embodiment, the third device is a computer device having a display and user input/output features, a processor, and memory. The first device 102 is configured to send and the third device 104 is configured to receive the one time code from the first device 102. The third device 104 may then be configured to display the one time code to the user. The user may then enter the one time code into the second device 106. In an exemplary embodiment, the one time code may be displayed on the third device as a QR code. In an exemplary embodiment, the second device may use its camera to take an image of the QR code on the third device. The second device may receive the one time code through the QR code. In an exemplary embodiment, the connection between the third device 104 and second device 106 is in the sending/receiving of the one time code, which may be through user output/input and/or electronic output/input. For example, the user may visually receive the code on the third device and enter the code on the second device. Alternatively, or in addition thereto the third device may communicate directly with the second device. For example, the third device may provide a visual image that is received and/or recognized by the second device through a camera or other visual detector. Other examples may include wireless communications such as radio frequency, near field communications, Bluetooth, wifi, etc.

In an exemplary embodiment, the connection between the first and third device may initially be limited to provide the one time code between the devices. The first and third device may have a further connection once the user is authenticated through the process described herein. The further connection may be the user signing into the first device to provide full access to the first device from the third device. Other levels of access are also contemplated herein. The access level may permit access to certain programs of the first device, access to certain areas of a network to which the first device is connected, access to certain documents, memory, programs, etc. The access level may be limited based on an access level associated with the user and/or the first device and/or to the information or data being accessed and/or combinations thereof.

In an exemplary embodiment, the process described herein may include a process of remotely accessing a first device where: connecting the first device to an authentication server; generating a one time code that is displayed on a login screen; where the first device is being remotely accessed from a third device, accepting a code at the second device using an application stored on the second device configured to accept the one time code; modifying the first device to exclusively display the one time code using a credential provider that can authenticate a user or other device to the first device; receiving and verifying the one-time code with the authentication server from the second device and verifying the authentication of the user of the second device; transmitting approval for authentication of the user by the authentication server to the first device; and upon receiving the approval for authentication, signing the user into the first device.

Exemplary embodiments of the process may also include different combinations of additional features and/or steps. For example, the application on the second device may optionally only be used when a registered user is authenticated to the second device, and/or where the second device is previously registered with the authentication server. The process may also optionally include displaying the one-time code on the third device from a connection to the first device. The process may also optionally include displaying the one-time code on the first device. The display of the one-time code may be a QR code. Accepting the one time code at the second device may optionally include entering the code in a user interface of the second device generated by the application on the second device. Accepting the one time code may optionally be through taking an image of the QR code and extracting the one-time code from information received from the QR code using the application on the second device.

Other configurations of receiving the one time code at the second device are also contemplated herein. For example, a wired or wireless connection may be created between the second device and the third device. For example, the second device may be coupled to the third device through Bluetooth, near field communication (NFC), wifi, etc. The one time code may be transmitted to the second device from the third device through the wired or wireless communication between the devices. The one time code may also be typed by the user in a user interface of the second device. The one time code may also be received in other configurations, such as other visuals, gestures, user inputs, etc.

An optional exemplary embodiment, the one-time code may be displayed as a QR code on a display screen on the device being used to access the first device. The one-time code may be transmitted to the authentication server by the second device. The second device may be configured through the application to receive, read, and/or process an image of the QR code, and process the information contained in the QR code and/or determine the one-time code from the QR code.

Using exemplary systems to employ the methods described herein that incorporate registry key modification, access to local and remote machines can be limited to a single credential provider that is installed to handle the specific remote authentication process or to other credential providers. In an exemplary embodiment, the exclusive use of the credential provider to send the one time code to the device of the user, such as the third device, is by modifying the registry keys of the operating system. In an exemplary embodiment, the first device is an electronic device running Microsoft Windows operating system. In an exemplary embodiment, the Microsoft Windows operating system comprises registry keys to set the authentication system used to authenticate a user to the first device. In an exemplary embodiment, at least one option of authentication to the first device is through WindowsMFA. The WindowsMFA authentication is used to authenticate the user to the device when the user authenticates to the device from the first device without remote access. The processes described herein permits the WindowsMFA to be replaced by another authentication system when a user is remotely accessing the first device.

By installing embodiments of the multi-factor authentication system described herein for remote access to a Windows machine protected by WindowsMFA, IT Administrators can facilitate stronger authentication standards for machine access, have an auditable log of when users sign into the machine and a consistent authentication method for desktop and web applications.

In an exemplary embodiment, the process described herein may include a process of remotely accessing a first device where: connecting the first device to an authentication server; generating a one time code that is displayed on a login screen; where the first device is being remotely accessed from a third device, accepting a code at the second device using an application stored on the second device configured to accept the one time code; receiving and verifying the one-time code with the authentication server from the second device and verifying the authentication of the user of the second device; transmitting approval for authentication of the user by the authentication server to the first device; and upon receiving the approval for authentication, signing the user into the first device.

The exemplary embodiment may optionally generate the one time code as a visual display code, such as a QR code, bar code, or other visual display. In an optional configuration, the system may be configured to generate a login interface as a display of the one time code without an input for a user name and/or password. In an optional configuration, the log in display may be on the first device. In an optional configuration, the log in display may be on the third device in communication with the first device. The system may therefore be configured to reproduce all or a part of a log in display from the first device onto a third device for remote access to the first device, wherein the log in display comprises a visual comprising a log in code.

In an exemplary optional embodiment, the second and third devices may be the same device. The first device may be different than the third device.

In an exemplary embodiment, the approval for authentication of the user sent to the first device may comprise providing an encrypted password to the first device. The encrypted password for approval may be provided after verification of the one-time code and user authentication is confirmed by the authentication server.

In an exemplary embodiment, approval for authentication of the user comprises unlocking a virtual smart card on the first device with an encrypted PIN transmitted from the authentication server to the first device after an authentication response is returned by the authentication server to the first device. The unlocked certificate of the virtual smart card may be used to log into the first device.

In an exemplary embodiment, the processes described herein may be used directly at the first device to provide additional or alternative authentication to the first device. In this case, the first device and the third device are the same device. The first device is therefore configured to display the user interface and provide the one-time code to the display.

Figure 2:
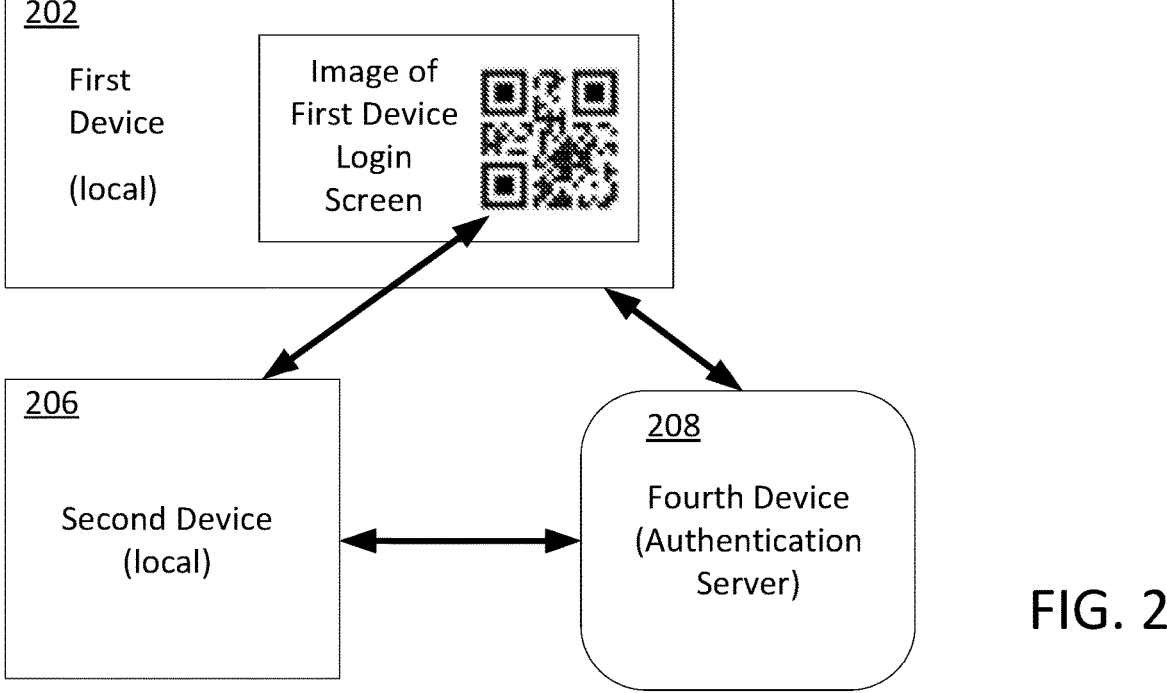
FIG. 2 illustrates an exemplary embodiment in which a user desires to access a first device directly. The system uses an authentication server (fourth device) as described herein to confirm that access is permitted through information received from a second device, where each of the first, second, and fourth devices are separate electronic devices.

FIG. 2 illustrates an exemplary embodiment in which a user desires to access a first device 202 directly. The system uses an authentication server (fourth device) 208 as described herein, such as with respect to FIG. 1, to confirm that access is permitted through information received from a second device 206, where each of the first, second, and fourth devices are separate electronic devices.

In an exemplary embodiment, the first device 202 is not remote from the user desiring access and instead of displaying the one time code on a third device 104 as described with respect to FIG. 1, it is displayed on the screen of the first device 202, where the exclusive use of the credential provider to display the one time code and authenticate the user account of the first device is set up by modification of the registry keys of a Microsoft Windows operating system. The system described with respect to FIG. 2 may have features of the first, second, and fourth devices as described with respect to FIG. 1.

In an exemplary embodiment, the process described herein may include a process of accessing a first device 202 where: connecting the first device 202 to an authentication server 208; generating a one time code that is displayed on a login screen; accepting a code at the second device 206 using an application stored on the second device configured to accept the one time code; modifying the first device 202 to exclusively display the one time code using a credential provider that can authenticate a user or other device to the first device; receiving and verifying the one-time code with the authentication server 208 from the second device 206 and verifying the authentication of the user of the second device; transmitting approval for authentication of the user by the authentication server 208 to the first device 202; and upon receiving the approval for authentication, signing the user into the first device.

Exemplary embodiments of the process may also include different combinations of additional features and/or steps. For example, the application on the second device may only be used when a registered user is authenticated to the second device, and/or where the second device is previously registered with the authentication server. The process may also include displaying the one-time code on the first device as a login display interface. The display of the one-time code may be a QR code, or other visual representation comprising the one time code. Accepting the one time code at the second device may include entering the code in a user interface of the second device generated by the application on the second device. Accepting the one time code may be through taking an image of the QR code and extracting the one-time code from information received from the QR code using the application on the second device.

An optional exemplary embodiment, the one-time code may be displayed as a QR code on a display screen on the first device. The one-time code may be transmitted to the authentication server by the second device. The second device may be configured through the application to receive, read, and/or process an image of the QR code, and process the information contained in the QR code and/or determine the one-time code from the QR code.

Other configurations of receiving the one time code at the second device are also contemplated herein. For example, a wired or wireless connection may be created between the second device and the first device. For example, the second device may be coupled to the first device through Bluetooth, near field communication (NFC), wifi, etc. The one time code may be transmitted to the second device from the third device through the wired or wireless communication between the devices. The one time code may also be typed by the user in a user interface of the second device. The one time code may also be received in other configurations, such as other visuals, gestures, user inputs, etc.

Using exemplary systems to employ the methods described herein that incorporate registry key modification, access to local machines can be limited to a single credential provider that is installed to handle the specific authentication process or to other credential providers. In an exemplary embodiment, the exclusive use of the credential provider to send the one time code to a login of the device to be accessed by a user (a first device) is by modifying the registry keys of the operating system. In an exemplary embodiment, the first device is an electronic device running Microsoft Windows operating system. In an exemplary embodiment, the Microsoft Windows operating system comprises registry keys to set the authentication system used to authenticate a user to the first device. In an exemplary embodiment, at least one option of authentication to the first device is through WindowsMFA. In an optional embodiment, the WindowsMFA authentication may be used to authenticate the user to the device when the user authenticates to the device from the first device without remote access and may be selected by the user for authentication. The processes described herein also or alternatively permits the WindowsMFA to be replaced by another authentication system when a user is accessing the first device. In an exemplary embodiment, the processes described herein may be used directly at the first device to provide additional or alternative authentication to the first device. The first device is therefore configured to display the user interface and provide the one-time code to the display.

In an exemplary embodiment, the exclusive use of the credential provider to send the one time code to the device of the user is by modifying the registry keys of the operating system. In an exemplary embodiment, the first device is an electronic device running Microsoft Windows operating system. In an exemplary embodiment, the Microsoft Windows operating system comprises registry keys to set the authentication system used to authenticate a user to the first device. In an exemplary embodiment, at least one option of authentication to the first device is through WindowsMFA. The processes described herein permits the WindowsMFA to be replaced by another authentication system to provide different or additional security to the login process.

In an exemplary embodiment, the approval for authentication of the user sent to the first device may comprise providing an encrypted password to the first device. The encrypted password for approval may be provided after verification of the one-time code and user authentication is confirmed by the authentication server.

In an exemplary embodiment, approval for authentication of the user comprises unlocking a virtual smart card on the first device with an encrypted PIN transmitted from the authentication server to the first device after an authentication response is returned by the authentication server to the first device. The unlocked certificate of the virtual smart card may be used to log into the first device.

Figure 3:
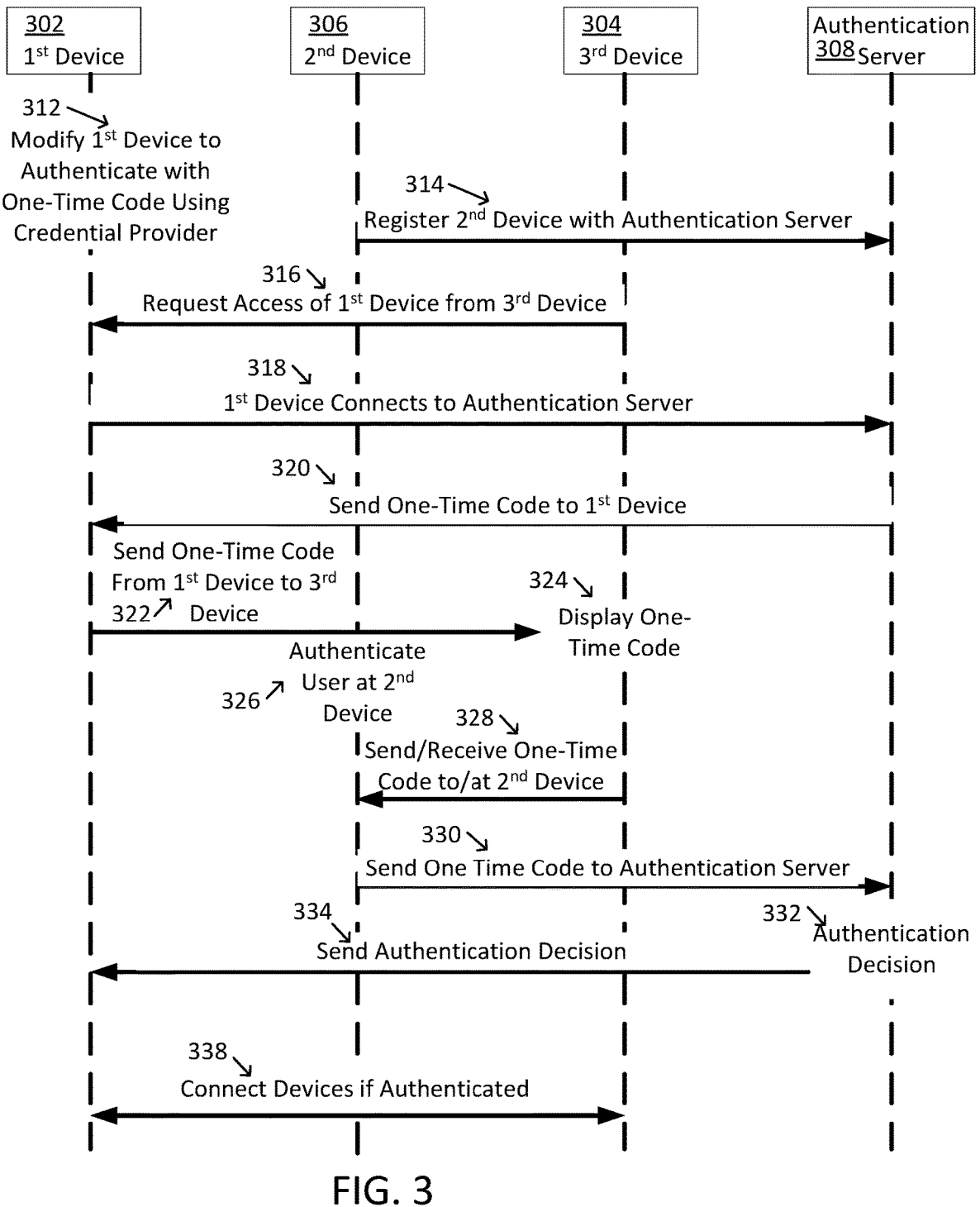
FIG. 3 illustrates the corresponding process that occurs for the illustrated remote access as illustrated in FIG. 1.

FIG. 3 illustrates an exemplary process diagram and communication between devices for a user trying to remotely connect to a first device 302 from a third device 304 that is authenticated with an authentication server 308 with authentication steps occurring with, on, or through a second device 306.

Initially, at step 312, the first device 302 is modified to authenticate the device outside of the Microsoft MFA using a one-time code credential provider as selected by the user or administrator.

The processes described herein permits the pre-programmed Windows multifactor authentication of Windows machines to be replaced by another authentication system when a user is remotely accessing the first device. Therefore, a user may access the first device 302 and modify the registry key so that access to local and remote machines can be limited to a single credential provider that is installed to handle the specific remote authentication process or to other credential providers. A user may therefore download an exemplary embodiment of a program to the first device that may, when installed and executed on the first device, modify the registry keys of the Microsoft machine and set the credential provider to perform the processes described herein. In an exemplary embodiment, the exclusive use of the credential provider to send the one time code to the device of the user, such as the third device, is by modifying the registry keys of the operating system. In an exemplary embodiment, the first device is an electronic device running Microsoft Windows operating system. In an exemplary embodiment, the Microsoft Windows operating system comprises registry keys to set the authentication system used to authenticate a user to the first device. Installing an authentication system according to embodiments described herein are configured to modify the registry keys of the Microsoft Windows operating system to exclusively use the authentication system described herein and bypass the Microsoft MFA system.

Initially at step 314, the second device 306 is also registered with the authentication server. The registration may include various features of authentication. For example, a user may install an application on the second device 306. The application may be configured to connect to and/or communicate with the authentication server 308. Through the application, the user may provide information to the authentication server, such as information about themselves, login credentials, information from their device, etc. A user may therefore set up an account or correlate the second device with the user account at the authentication server. Various methods or means may be used to identify the second device and associate the second device to the user account at the authentication server. For example, device information may be used, such as device identifiers, device operating device characteristics, etc. The application may also uniquely identify the device such as assigning a device identification to the device and storing the device identification at the device and/or with the user account at the authentication server.

After initial set up by providing the required software stored in memory at the first device and/or second device and configuring the systems according to embodiments described herein and/or registering the required users and/or devices, a user may attempt to remotely access the first device 302, such as from a third device 304. The third device may be the same as the first device or second device according to embodiments described herein. However, for the explanation of the instant embodiment, the first device 302, second device 306, third device 304, and authentication server 308 are separate devices not contained in the same housing, but which may communicate with each other through communication interfaces as described herein.

A process for providing remote access to a first device 302 may start from the user's perspective at step 316 in which the user attempts to access the first device 302 from the third device 304. The user may engage directly with the third device 304 by using the device peripherals and/or user input/output devices to request access to the first device from the third device. The user may use a user interface on the third device to make a request or make a selection to request access to the first device. The third device 304 may connect through a communication network to the first device 302. The connection between the third device 304 and the first device 302 may be limited until a user is authenticated according to embodiments described herein. Optionally, a connection may be made to alert the first device that a request for access is being made and to provide a one-time code from the first device to the third device according to embodiments described herein. Optionally, a connection may be made to alert the first device that a request for access is being made and to permit the first device to communicate with the authentication server to exchange a one-time code between the first device, the third device, and the authentication server according to embodiments described herein.

After a request to connect is made from the third device 304 to the first device 302, at step 318 and 320, a one-time code may be generated and communicated between the first device 302 and the authentication server 308. At step 318, the first device 302 may be connected through a network or other communication interface to the authentication server 308. At step 320, the authentication server may provide a one time code to the first device 302. Other orders of communication of a one time code are also contemplated herein. For example, steps 318/320 may be replaced with the first device 302 generating the one time code and communicating the one time code to the authentication server. The first device and the authentication server may also have a rolling algorithm that may automatically create one time codes independently so that communication between the first device and authentication server at the time of log in is not necessary. However, generating and communicating the one time code immediately adjacent to the time of logging in from the initial request to permit access to when an authentication decision is made may provide added security as the algorithm to generate the rolling unique codes may not be cracked or observed through failed attempts or may not get out of sync from failed attempts.

Once the one-time code is generated and/or communicated between the device and the authentication server, at step 322, the third device 304 may receive the one time code. As illustrated, the first device 302 communicates the one time code received from the authentication server from step 320 to the third device through the limited connection between the first device and the third device. This configuration permits the third device to not directly communicate with the authentication server and/or know anything about the authentication server. Accordingly the third device does not need a special configuration, pre-authorization, or other set up to provide the remote connection to the first device. However, alternative embodiments permit the third device to receive the one time code in other ways. For example, the third device may be in communication with the authentication server and receive the one time code from the authentication server instead of the first device according to alternative embodiments.

Once the third device 304 receives the one time code, at step 324, the third device 304 may display the code or otherwise share the code with the user and/or the second device 306. The following steps illustrate a specific embodiment in which the code is displayed on a display device of the third device and then received through a visual detector of the second device; however, embodiments of the process and systems described herein are not so limited. Instead, other communication methods and devices may be used to communicate the code from the third device to the second device according to alternative and/or optional embodiments described herein. For example, other visual methods may be used, such as a visual indication of a number or alphanumeric display, a bar code, another encrypted code, or other signal, such as audial, radio frequency, near field communication, wifi or other wired or wireless communication from the third device to the second device to obtain the one time code at the second device from the third device.

In an exemplary embodiment, the one time code is displayed at the third device on a visual display of the third device. The visual display may be an alpha and/or numeric code displayed to the user. Other displays may also be used, such as in a quick response (QR) code, bar code, or other visual encrypted code.

At step 326, the user may access an application stored on the second device 306 that is configured to communicate with the authentication server 308. The application may have previously been installed and registered, such as at step 314. The user may authenticate at step 326 at or proximate the time to access the first device, and may be separate from the original registration of the second device to the authentication server. The user may be required to authenticate through the local application on the second device before being able to access the application to communicate with the authentication server. This provides an additional layer of authentication. Exemplary authentications to access the application on the second device may include any authentication option, such as any combination of, without limitation, entering a user code, password, pattern recognition, image selection, biometric matching (face, fingerprint, eye, etc.), or other credential comparison. Once the user is authenticated at the second device, the user may be able to execute the application on the second device that may provide communication of the second device with the authentication server.

Once the application on the second device is accessed through authentication of the user at the second device, at step 326, the second device may be configured through the application to receive the one time code from the third device to the second device. As described herein, various methods may be used to transfer the one time code from the third device to the second device. In an exemplary embodiment, launching the application on the second device, after authenticating the user at the second device to log into the application on the second device, the application may use the camera or other detector or receiver on the second device to retrieve the one time code from the third device. If the third device is visually displaying the one time code on a screen of the third device, the application on the second device may open up an interface to the camera on the second device, may provide a target location in which the one time code should be aligned with the image from the camera for detection, and may receive an image of the one time code through the camera of the second device. The second device, through the application may be configured to extract the one time code from the visual image received from the third device. As explained herein, the visual image may be in the presentation of an alpha and/or numeric representation, QR code, bar code, or other visual representation. The application on the second device may be configured to receive and analyse the received image to extract the one time code.

Once the second device receives the one time code, at step 330, the second device may send the one time code to the authentication server using the application on the second device. The application on the second device may be configured to connect the second device to the authentication server. The application may be configured to send information to the authentication server. Information sent to the authentication server may include information received from the third device, such as the one time code. Information about the transaction may also or alternatively be transmitted from the third device to the second device and to the authentication server. For example, session identifiers, user information, device information, unique codes associated with the user, the request to permit access, the second device, the first device, the third device, the user account, or any combination thereof or other information desirable to authenticate the user may be transmitted from the third device to the second device and/or from the second device to the authentication server.

At step 332, the authentication server, after receiving information from the second device at step 330 may determine whether the user and/or devices are authorized to permit access to the first device 302 from the third device 304. The authentication server may determine that the access request is permitted (authenticated) by comparing the one time code received from the second device at step 330 with the one time code generated and send to the first device at step 320 or received from the first device in an alternative embodiment. When the one time code is therefore generated around steps 318, 320, the authentication server may store a copy of the one time code at the authentication server for comparison in the authentication step 332. The system may also provide additional authentication, such as providing a time limit in which a one-time code is valid, or in receiving additional identifiers from the second device to confirm the authenticity of the second device (using, such as, for example, a device identifier or other unique attribute of the device or user as described herein or otherwise known in the field).

Once the authentication server 308 makes the authentication decision at step 332, the authentication server 308 communications the authentication decision or other log in confirmation or rejection to the first device 302 at step 334. The authentication server 308 may simply provide an indication to permit access to the first device from the third device by confirming the receipt of the one time code is correct. The authentication server 308 may alternatively or in addition provide other confirmations or log in information to the first device at step 338. As described herein, and particularly with respect to FIG. 5, additional features of the authentication process may optionally be included in the process.

Once authentication is complete and the process is confirmed as authentic, then the first device 302 may connect to the third device 304 and permit remote access at step 338. The user may thereafter access data, processing, or otherwise communicate with the first device from the third device. Access levels or other restrictions may be in place according to optional embodiments described herein. For example, the user may obtain full access to the first device and/or in any connected devices to the first device. Alternatively, the user may obtain partial access to the first device, such as in a category of data, or in the location of storage or only to certain files, or access only to limited portions of connected systems to the first device. The level of access may depend on the authorization provided to the user, the restrictive characteristics of the information being accessed or requested, or other criteria.

Exemplary embodiments described herein therefore provide a process of remotely accessing a first device where: a first device is modified to provide a one time code using a credential provider that can authenticate a user or other device to the computer that is not the Microsoft MFA or other Microsoft required authentication system; the first device is accessed remotely from a third device; the first device is connected to an authentication server that generates a one time code; the code is transferred to a second device with an application on the second device that accept the one time code; the authentication server receives and verifies the one-time code from the second device and verifies the authentication of the user of the second device; approval for authentication of the user is transmitted by the authentication server to the first device; and upon receiving the approval for authentication, the user is signed into the first device. If approval for authentication is not received at the first device by the authentication server, then the user is not signed into the first device.

Exemplary embodiments of the process provided herein may include additional or alternative optional features. These may include, for example, and combination of: the second device application can only be used when a registered user is authenticated to the second device and; where the second device is a previously registered device with an authentication server; the one-time code is displayed as a QR code displayed on a third device as an image of a login screen of the first device and transmitted to an authentication server by the second device, the second device being able to read and process the information contained in the QR code; the first device is not remote and instead of displaying the one time code on a third device, it is displayed on the screen of the first device; the exclusive use of the credential provider to provide the one time code and authenticate the user account of the first device is set up by modification of the registry keys of a Microsoft Windows operating system; the exclusive use of the credential provider to display the one time code and authenticate the user account of the first device is set up by modification of the registry keys of a Microsoft Windows operating system; an encrypted password is returned to the first device after verification of the one-time code and user authentication by the authentication server; authentication of the user includes unlocking a virtual smart card on the first device after an authentication response is returned by the authentication server to the first device; the unlocked virtual smart card is used to log into the first device; and/or the one-time code is communicated to the second device from the first device through Bluetooth, NFC, or other communication protocol.

Exemplary embodiments described herein include a process of accessing a first device, that includes modifying the first device to exclusively use only one credential provider to authenticate a user; connecting the first device to an authentication server; generating a one time code; transferring the one time code to a second device; connecting the second device to the authentication server; sending the one time code from the second device to the authentication server; confirming the one time code with the authentication server; communicating approval for authentication of the user from the authentication server to the first device when the one time code is confirmed with the authentication server; and signing the user into the first device after the approval for authentication of the user is communicated to the first device. The modification to the first device may prevent the user of, circumvent, or otherwise bypass the use of the manufacturer's programmed authentication system associated with the operating system of the company that provides the operating system. For example, for a Microsoft Windows machine, the modification of the first device may use a credential provider that is installed on the machine that is different from the Microsoft multi-factor authentication used and installed on Windows machines with the operating system.

Exemplary embodiments of the present disclosure also provides for a process of remotely accessing a first device including: modifying the first device to exclusively display the one time code using a credential provider that can authenticate a user or other device to the first device; connecting the first device to an authentication server; generating a one time code that is displayed on a login screen; where the first device is being remotely accessed from a third device, accepting a code at the second device using an application stored on the second device configured to accept the one time code; receiving and verifying the one-time code with the authentication server from the second device and verifying the authentication of the user of the second device; transmitting approval for authentication of the user by the authentication server to the first device; and upon receiving the approval for authentication, signing the user into the first device.

Figure 4:
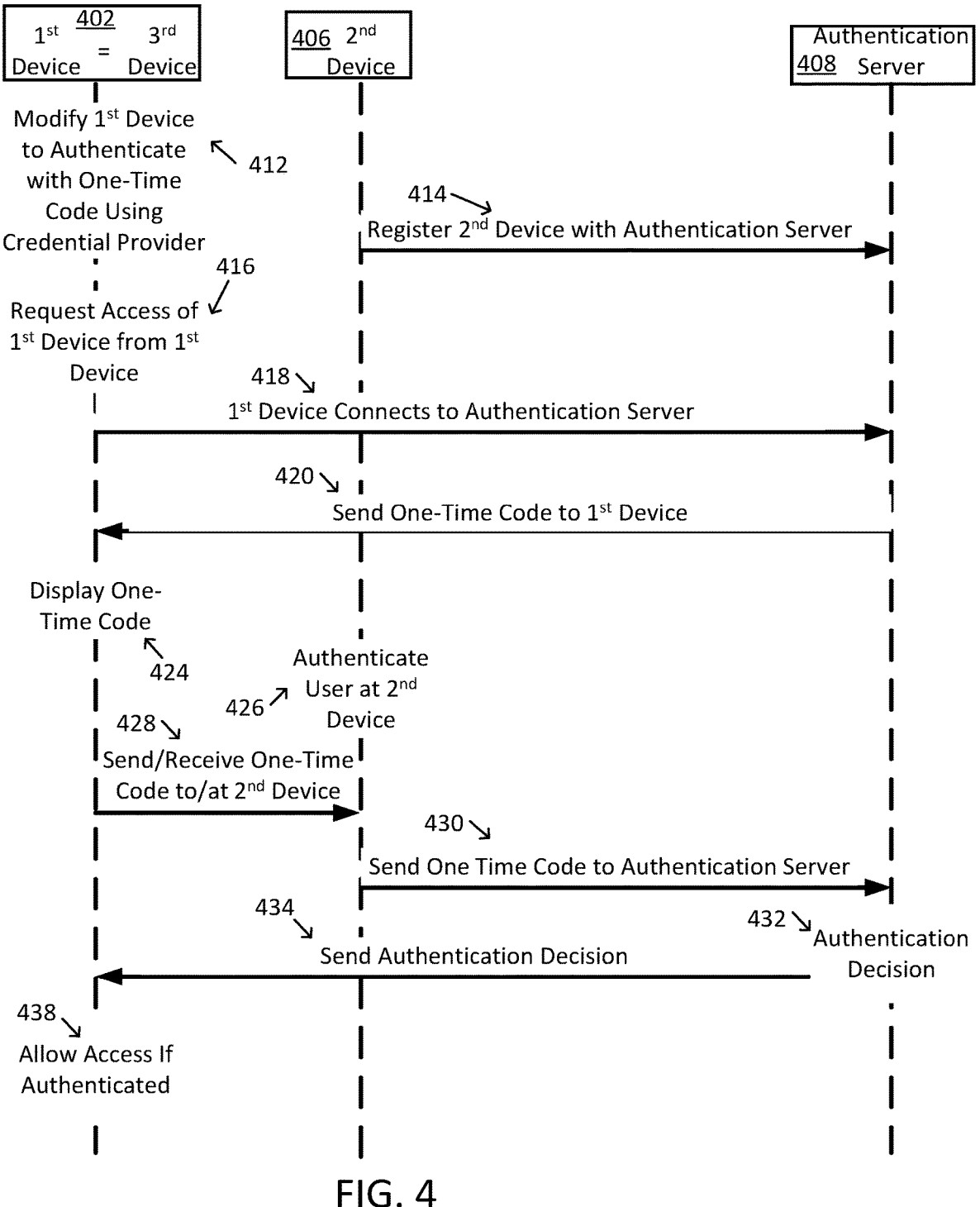
FIG. 4 illustrates the corresponding process that occurs for the illustrated direct access as illustrated in FIG. 2.

As shown and described herein, the system and methods may be modified to permit direct access to the machine through a similar process so that direct access and remote access may follow similar authentication procedures. For example, FIG. 4 illustrates an exemplary flow diagram of a process in which a user is requesting access to the first machine directly from or at the first machine, an embodiment in which the third machine is the first machine. Therefore, a user is requesting access to a first machine 402 using a second device 406 to assist in authentication from an authentication server 408. The second device, the application on the second device, and the authentication server may have attributes and/or features as those described with respect to FIG. 3.

Initially, at step 412, the first device 402 is modified to authenticate the device outside of the Microsoft MFA using a one-time code credential provider as selected by the user or administrator.

The processes described herein permits the pre-programmed Windows multifactor authentication of Windows machines to be replaced by another authentication system when a user is accessing the first device. Therefore, a user may access the first device 402 and modify the registry key so that access to the machine directly can be limited to a single credential provider that is installed to handle the specific authentication process or to other credential providers. A user may therefore download an exemplary embodiment of a program to the first device that may, when installed and executed on the first device, modify the registry keys of the Microsoft machine and set the credential provider to perform the processes described herein. In an exemplary embodiment, the exclusive use of the credential provider to send the one time code to the device of the user, such as the second device, is by modifying the registry keys of the operating system. In an exemplary embodiment, the first device is an electronic device running Microsoft Windows operating system. In an exemplary embodiment, the Microsoft Windows operating system comprises registry keys to set the authentication system used to authenticate a user to the first device. Installing an authentication system according to embodiments described herein are configured to modify the registry keys of the Microsoft Windows operating system to exclusively use the authentication system described herein and bypass the Microsoft MFA system.

Initially at step 414, the second device 406 is also registered with the authentication server. The registration may include various features of authentication. For example, a user may install an application on the second device 406. The application may be configured to connect to and/or communicate with the authentication server 408. Through the application, the user may provide information to the authentication server, such as information about themselves, login credentials, information from their device, etc. A user may therefore set up an account or correlate the second device with the user account at the authentication server. Various methods or means may be used to identify the second device and associate the second device to the user account at the authentication server. For example, device information may be used, such as device identifiers, device operating device characteristics, etc. The application may also uniquely identify the device such as assigning a device identification to the device and storing the device identification at the device and/or with the user account at the authentication server.

After initial set up by providing the required software stored in memory at the first device and/or second device and configuring the systems according to embodiments described herein and/or registering the required users and/or devices, a user may attempt to access the first device 402 directly (as opposed to remotely from a third device 304 as described by the embodiment of FIG. 3).

A process for providing direct access to a first device 402 may start from the user's perspective at step 416 in which the user attempts to access the first device 402 from the first device 402, such as through a user log in screen. The user may engage directly with the first device 402 by using the device peripherals and/or user input/output devices to request access to the first device from the third device. The user may use a user interface on the first device to make a request or make a selection to request access to the first device.

After a request to access is made from the first device 402, at step 418 and 420, a one-time code may be generated and communicated between the first device 302 and the authentication server 308. At step 418, the first device 402 may be connected through a network or other communication interface to the authentication server 408. At step 420, the authentication server may provide a one time code to the first device 402. Other orders of communication of a one time code are also contemplated herein. For example, steps 418/420 may be replaced with the first device 402 generating the one time code and communicating the one time code to the authentication server. The first device and the authentication server may also have a rolling algorithm that may automatically create one time codes independently so that communication between the first device and authentication server at the time of log in is not necessary. However, generating and communicating the one time code immediately adjacent to the time of logging in from the initial request to permit access to when an authentication decision is made may provide added security as the algorithm to generate the rolling unique codes may not be cracked or observed through failed attempts or may not get out of sync from failed attempts.

Once the one-time code is generated and/or communicated between the device and the authentication server, at step 424, the first device 402 may display the code or otherwise share the code with the user and/or the second device 406. The following steps illustrate a specific embodiment in which the code is displayed on a display device of the first device and then received through a visual detector of the second device; however, embodiments of the process and systems described herein are not so limited. Instead, other communication methods and devices may be used to communicate the code from the first device to the second device according to alternative and/or optional embodiments described herein. For example, other visual methods may be used, such as a visual indication of a number or alphanumeric display, a bar code, another encrypted code, or other signal, such as audial, radio frequency, near field communication, wifi or other wired or wireless communication from the first device to the second device to obtain the one time code at the second device from the first device.

In an exemplary embodiment, the one time code is displayed at the first device on a visual display of the third device. The visual display may be an alpha and/or numeric code displayed to the user. Other displays may also be used, such as in a quick response (QR) code, bar code, or other visual encrypted code.

At step 426, the user may access an application stored on the second device 406 that is configured to communicate with the authentication server 408. The application may have previously been installed and registered, such as at step 414. The user may authenticate at step 426 at or proximate the time to access the first device, and may be separate from the original registration of the second device to the authentication server. The user may be required to authenticate through the local application on the second device before being able to access the application to communicate with the authentication server. This provides an additional layer of authentication. Exemplary authentications to access the application on the second device may include any authentication option, such as any combination of, without limitation, entering a user code, password, pattern recognition, image selection, biometric matching (face, fingerprint, eye, etc.), or other credential comparison. Once the user is authenticated at the second device, the user may be able to execute the application on the second device that may provide communication of the second device with the authentication server.

Once the application on the second device is accessed through authentication of the user at the second device, at step 426, the second device may be configured through the application to receive the one time code from the first device 402 to the second device. As described herein, various methods may be used to transfer the one time code from the first device to the second device, similar to the communication from the third device to the second device. In an exemplary embodiment, launching the application on the second device, after authenticating the user at the second device to log into the application on the second device, the application may use the camera or other detector or receiver on the second device to retrieve the one time code from the first device. If the first device is visually displaying the one time code on a screen of the first device, the application on the second device may open up an interface to the camera on the second device, may provide a target location in which the one time code should be aligned with the image from the camera for detection, and may receive an image of the one time code through the camera of the second device. The second device, through the application may be configured to extract the one time code from the visual image received from the third device. As explained herein, the visual image may be in the presentation of an alpha and/or numeric representation, QR code, bar code, or other visual representation. The application on the second device may be configured to receive and analyse the received image to extract the one time code.

Once the second device receives the one time code, at step 430, the second device may send the one time code to the authentication server using the application on the second device. The application on the second device may be configured to connect the second device to the authentication server. The application may be configured to send information to the authentication server. Information sent to the authentication server may include information received from the first device, such as the one time code. Information about the transaction may also or alternatively be transmitted from the first device to the second device and to the authentication server. For example, session identifiers, user information, device information, unique codes associated with the user, the request to permit access, the second device, the first device, the user account, or any combination thereof or other information desirable to authenticate the user may be transmitted from the first device to the second device and/or from the second device to the authentication server.

At step 432, the authentication server, after receiving information from the second device at step 430 may determine whether the user and/or devices are authorized to permit access to the first device 402. The authentication server may determine that the access request is permitted (authenticated) by comparing the one time code received from the second device at step 430 with the one time code generated and send to the first device at step 420 or received from the first device in an alternative embodiment. When the one time code is therefore generated around steps 418, 420, the authentication server may store a copy of the one time code at the authentication server for comparison in the authentication step 432. The system may also provide additional authentication, such as providing a time limit in which a one-time code is valid, or in receiving additional identifiers from the second device to confirm the authenticity of the second device (using, such as, for example, a device identifier or other unique attribute of the device or user as described herein or otherwise known in the field).

Once the authentication server 408 makes the authentication decision at step 432, the authentication server 408 communications the authentication decision or other log in confirmation or rejection to the first device 402 at step 434. The authentication server 408 may simply provide an indication to permit access to the first device by confirming the receipt of the one time code is correct. The authentication server 408 may alternatively or in addition provide other confirmations or log in information to the first device at step 438. As described herein, and particularly with respect to FIG. 5, additional features of the authentication process may optionally be included in the process.

Once authentication is complete and the process is confirmed as authentic, then access to the first device 402 may be granted or permitted. The user may thereafter use the first device. Access levels or other restrictions may be in place according to optional embodiments described herein. For example, the user may obtain full access to the first device and/or in any connected devices to the first device. Alternatively, the user may obtain partial access to the first device, such as in a category of data, or in the location of storage or only to certain files, or access only to limited portions of connected systems to the first device. The level of access may depend on the authorization provided to the user, the restrictive characteristics of the information being accessed or requested, or other criteria.

Figure 5:
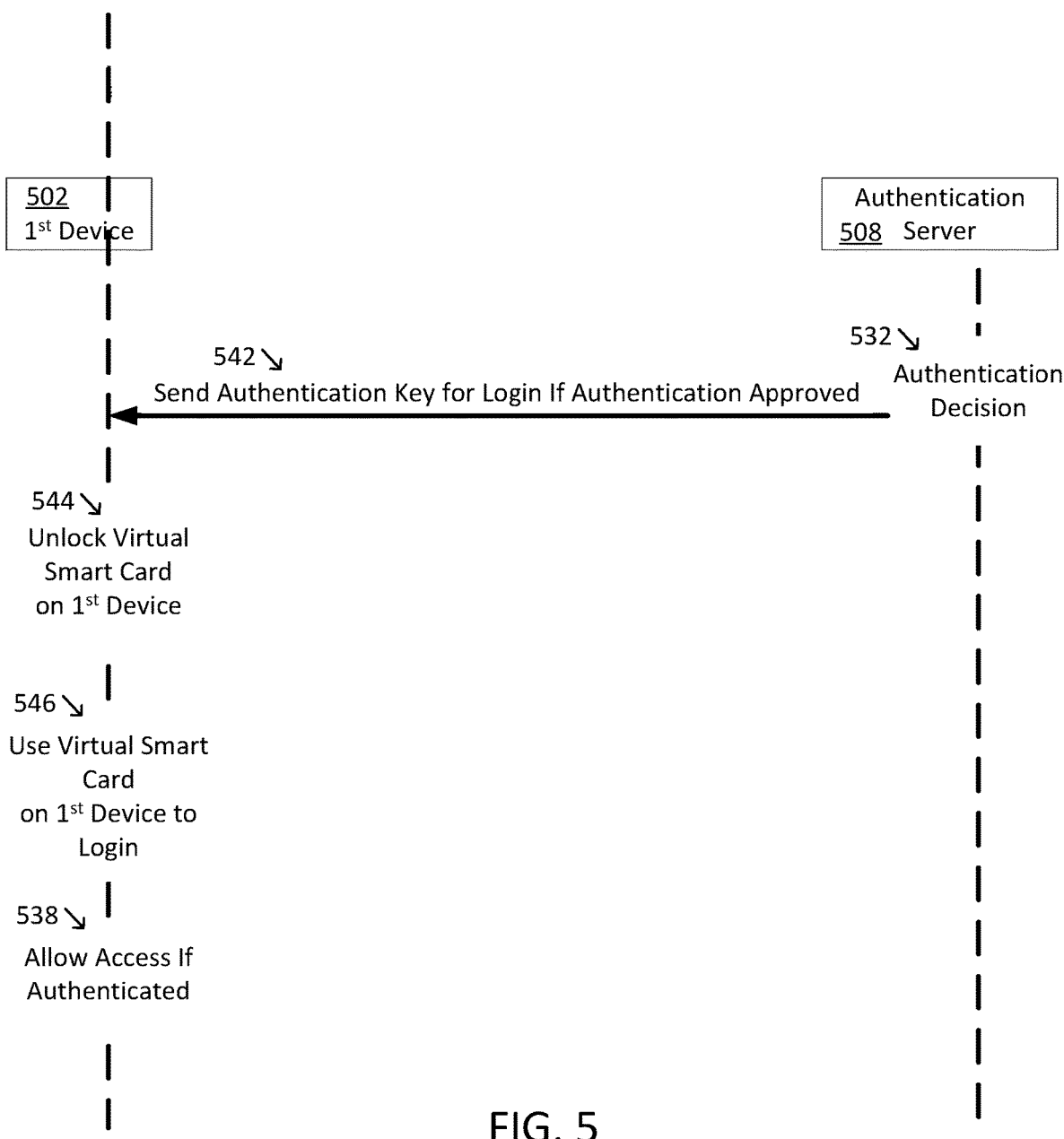
FIG. 5 illustrates additional process sets that may be part of exemplary embodiments of the methods described herein.

FIG. 5 illustrates an exemplary optional process that may be used in combination with the embodiments of FIGS. 3 and/or 4 described herein. The additional steps are related to the login of the first device 502 when the authentication decision 532 is made by the authentication server 508. The process described herein may be used in combination with or instead of the authentication approval provided in step 334 or 434 of FIG. 3 or 4.

Once the authentication server 508 confirms the one time passcode and authenticates the user and/or device according to any combination of embodiments described herein, the authentication server 508 may make an authentication decision at 532. If the authentication decision is positive and the user may be permitted to access the first device 502, the authentication server 508 at step 542 may send an authentication key to the first device. Upon receiving the authentication key, the first device 502 at step 544 may be unlocked. Various embodiments of the authentication key may be within the scope of the current disclosure. For example, the authentication key may simply be an approval sent from the authentication server and received by the first device. The authentication key may be anything to indicate the authorization of the user and/or device for accessing the first device. The authentication key may be anything in which the first device is configured to receive and unlock the device. For example, the authentication key may be an approval sent from the authentication server, received at the first device, and unlocks the first device. The authentication key may be a password. The password may be selected by the user and programmed into the system to be communicated from the authentication server to the first device. The password may be selected by the system and not ever known by the user. For example, during registration of a user and/or device, the authentication server may create a login credential and send it to the first device for storage. The authentication server may then resend the login credential during authentication and the first device may use it to locally authenticate the login attempt when the authentication server sends the authentication key to the first device for login. The authentication key may be other log in credential, such as, for example, a token, string, etc. The authentication key may be encrypted during transit from the authentication server to the first device. In an exemplary embodiment, the authentication key may optionally be used to unlock a virtual smart card on the first device. Using the unlocked virtual smart card at step 546, the first device may use the received encrypted password (or other authentication key) from the authentication server to log the user into the first device. Thereafter, at step 538, the user may be provided access to the first device, either directly or through a remote connection from a third device.

Figure 6:
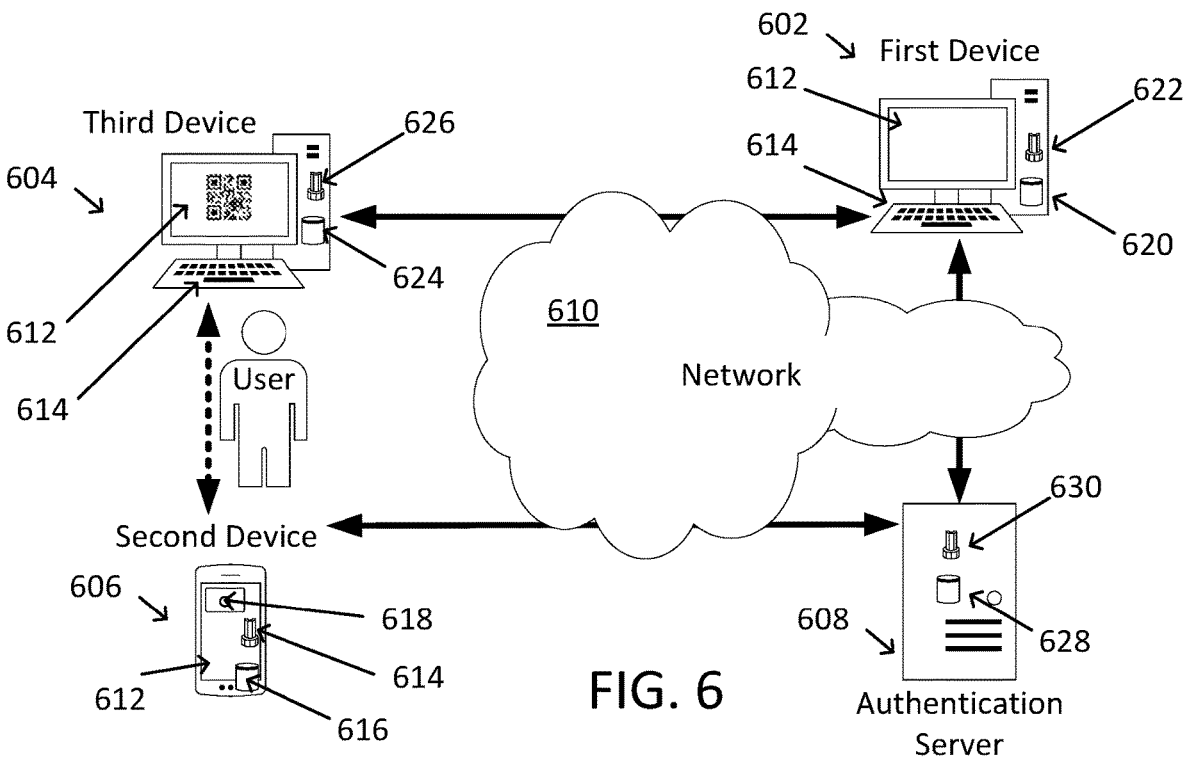
FIG. 6 illustrates an exemplary system diagram for the remote access system of FIGS. 1 and 3.
Figure 7:
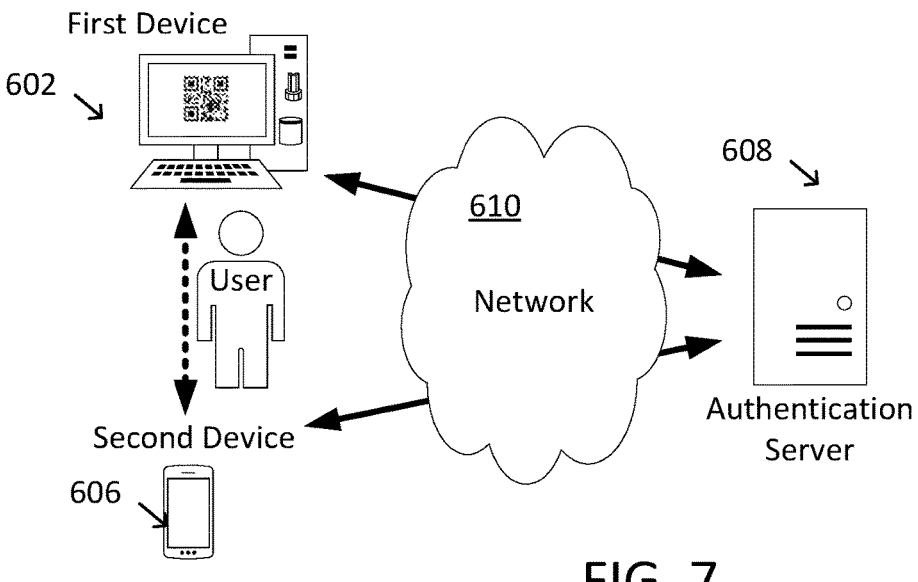
FIG. 7 illustrates an exemplary system diagram for the direct access system of FIGS. 2 and 4.

FIGS. 6 and 7 illustrate exemplary system configurations in which a user may try to access a first device 602 either directly or remotely from a third device 604, using a second device 606 for authentication and an authentication server 608. The first device and third device may be in communication through a network 610, such as the internet. The first device and the authentication server may also be in communication through the same or a different network 610, such as the internet. The second device and the authentication server may be in communication through the same or a different network 610, such as a mobile network or the internet. The third device or first device may be in communication with the second device locally such as through user outputs/inputs, direct location connection through visual outputs/inputs, local communications such as near field communication, radio frequency communication, and/or wifi communication, etc.

In an exemplary embodiment, the system may comprise a first application resident on a user's personal electronic device, such as the second device 606 described herein. The application may be stored as non-transitory machine readable instructions within memory 616 of the user's personal electronic device. The application may be configured to perform functions described herein when executed by a processor 614 of the user's personal electronic device. Exemplary functions of the application may include receiving a code and sending the code to an authentication server 608 through a communication link between the second device 606 and the authentication server 608. In an optional configuration, the receipt of the code may be through a user interface displayed to the user and a code entered into the user input. In an optional configuration, the receipt of the code may be through a user interface 612 in which the user takes a picture of the code using a camera 618 on the second device 606 and the application is configured to extract the code from the image. In an optional configuration, the code may be contained within a QR code, bar code, or other visual code that may be extracted from the picture of the code.

In an optional embodiment, an application resident on the second device 606 may be configured with its own authentication requirements before the user may access the application on the second device. For example, the application may require a user's password, biometric authentication (such as face or fingerprint), pin codes, or other access requirements. Once the application is accessed, the application may be executed and may be configured to use the user's electronic device to receive an image and communicate with an authentication server.

Once the user executes the application on the second device 606, the application may be configured to connect to an authentication device. In an exemplary embodiment, the user's electronic device, application, and/or credentials may be registered with the authentication device. The application may be used to create a secure connection between the authentication server and the application of the user's electronic device.

In an exemplary embodiment, the system may comprise a program resident on the device to be accessed by a user (the first device 602). The program may be the credential provider application described herein. The program may be stored as non-transitory machine readable instructions within memory 620 of the device to be accessed by a user, the first device 602. The program may be configured to perform functions described herein when executed by a processor 622 of the device to be accessed by the user. In an exemplary embodiment, the application may be configured to modify registry key(s) of the device to be accessed by the user to limit the registration credential to a single credential provider that is installed to handle the specific authentication process that is different from the original authentication system installed on the device with the operating system. In other words, the registry key(s) of a Windows device is modified so that the system uses a single credential provider that is not Microsoft MFA or other authentication system or program by Microsoft. In an exemplary embodiment, the exclusive use of the credential provider may be configured to send the one time code to the device of the user by modifying the registry keys of the operating system. In an exemplary embodiment, the first device is an electronic device running Microsoft Windows operating system. In an exemplary embodiment, the Microsoft Windows operating system comprises registry keys to set the authentication system used to authenticate a user to the first device. An optional configuration of the program may be to display a code as a log in screen on the device to be accessed by a user. The display of the log in screen may also be communicated in whole or in part to another device if the user is attempting remote access to the device to be accessed by a user from another device. As described herein, the code may be an alpha-numeric code or may be contained within an image, such as a QR code or bar code or other visual depiction of a code. In an optional configuration of the system, the device to be accessed by a user is a Microsoft machine.

In an optional embodiment, the system may comprise another program resident on a remote device (a third device 604) that may be used to access a device to be accessed by a user (the first device 602), referring to FIG. 6 instead of FIG. 7. The another program may be stored as non-transitory machine readable instructions within memory 624 of the third device 604. The another program may be configured to perform functions described herein when executed by a processor 626 of the third device. In an exemplary embodiment, the another program may be configured to communicate with the device to be accessed by a user (the first device 602). The another program may also or alternatively be configured to retrieve a login interface from the device to be access by a user (the first device 602) and display the retrieved login interface to a user at the display of the third device 604. Each of the electronic devices may include user outputs, such as displays 612, or user inputs such as keyboards 614, mouses, touch screens, etc.

In an exemplary embodiment, the system may comprise an authentication program resident on an authentication server 608 that may be used to authenticate the user and/or second device 606 or third device 604 for access to the device to be accessed by a user (the first device 602), either directly or indirectly from a remote device. In an exemplary embodiment, the authentication program is configured to permit communication between the authentication server 608 and the device to be accessed by a user (the first device 602) and/or between the authentication server 608 and the user's personal electronic device (the second device 606). The authentication program may be configured to generate a code and send the code to the device to be accessed by a user (the first device 602). The authentication program may also be configured to receive the code from a user through the application on the user's personal electronic device. The authentication program may be configured to authenticate the code and confirm an access permission for the device to be accessed by a user from the code. The authentication program may be configured to communicate the access permission to the device to be accessed by the user and thereafter permit the device to be accessed by a user to log in the user to the device to be accessed by the user.

In an exemplary embodiment, the authentication server may be configured with an authentication program stored in memory 628 that is configured to perform functions when executed by a process 630 such as any combination of: create a one time code, receive/store/transmit data about a user to/from a user database stored in memory 628, receive data such as the one time passcode from the application stored on the second device, to confirm the one time code by comparing the received one time code from the second device with the one time code stored in memory as generated earlier, to send a confirmation of authentication when the passcodes match, to send a denial of authentication when the passcodes do not match, to send an encrypted passcode, etc. To confirm the one time code, the authentication server may compare the received code with a prior code stored at the authentication server. In an optional configuration, the one time code may be generated by the authentication server and communicated to the first device. The one time code may be stored at the authentication server for comparison upon receipt of a code from the second device. In an optional configuration, the one time code may be generated by the first device and communicated to the authentication server. The authentication server may be configured to store the code received from the first device for comparison upon receipt of a code from the second device. In an exemplary embodiment, to confirm a comparison between the stored code at the authentication device and the received code from the user's personal electronic device, the comparison must match. In an exemplary embodiment, to confirm a comparison between the stored code at the authentication device and the received code from the user's personal electronic device, the comparison must match within a threshold.

Exemplary embodiments have been described herein in terms of one or more applications resident on different system components and electronic devices. Exemplary embodiments are not so limited and features of one application and/or program may be performed by other applications or programs. For example, the communication between devices may be managed by one or more of the different applications/programs as would be understood by a person of skill in the art.

The device to be accessed by a user may be securely connected to the authentication server. In an exemplary embodiment, an OpenID Connect (OIDC) protocol may be used for the exchange of information between the authentication server and the credential provider on the device to be accessed by a user (the first device 602). Other protocols such as SAML could be used.

FIGS. 8-31 show various user interfaces that may be displayed on any combination of the first device, the second device, the third device, and/or the authentication server as described herein for installing and/or registering one or more programs or applications on any of the devices according to embodiments described herein, and/or in using any combination of the programs and applications of the system to perform the methods described herein. The user interfaces provided herein are exemplary only.

FIGS. 8-31 provide non-limiting specific examples of exemplary user interfaces of the devices described herein representing the process(es) and system(s) described herein. Any component described herein may be used in combination with the process and/or system for accessing a first device as described herein.

The process and/or system of accessing a first device may include: connecting the first device to an authentication server; generating a one time code; transferring the one time code to a second device; connecting the second device to the authentication server; sending the one time code from the second device to the authentication server; confirming the one time code with the authentication server; modifying the first device to exclusively use only one credential provider to authenticate a user; communicating approval for authentication of the user from the authentication server to the first device when the one time code is confirmed with the authentication server; and singing the user into the first device after the approval for authentication of the user is communicated to the first device.

The process and/or system may also include any combination of features described in this section.

Exemplary system requirements of a first device described herein may include supported operating systems for the WindowsMFA such as Windows 10 or Windows 11 operating systems and the supported user types may include active directory, azure active directory, or local user.

In an exemplary example, the remote multifactor authentication process described herein may include a one-to-one mapping between a Windows User Profile, Windows MFA application and Remote MFA user profile. Therefore, for each and every Windows User Profile, the system can have a single OIDC Windows Credential Provider application and Remote MFA user profile. The Remote MFA user profile may also work in a one-to-many, many-to-one, or many-to-many mapping depending on the use case.

Figure 8:
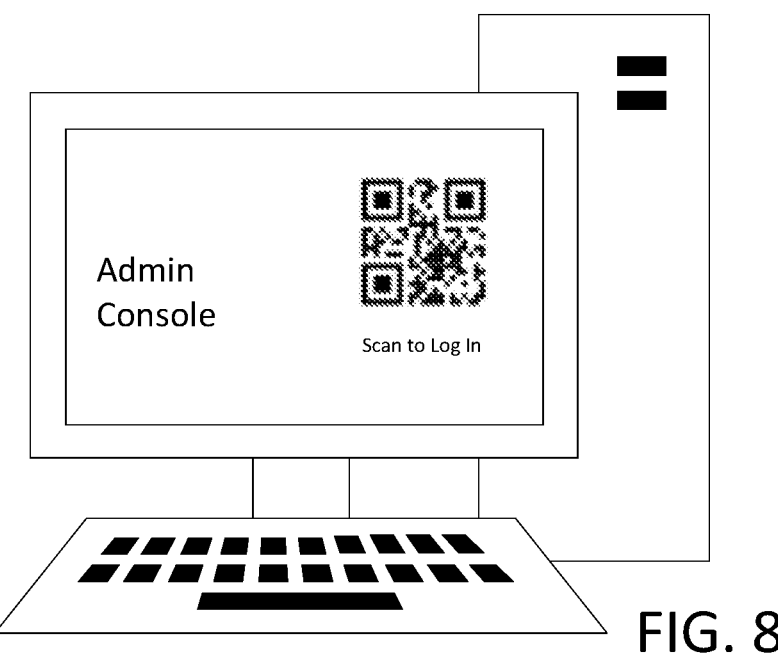

FIG. 8 illustrates an exemplary administrative console where an administrator can sign into the administrator console. The administrator can sign in and choose to create users for the system. The administrator can provide information about a user, such as their first and/or last name, email, phone number, address, date of birth, or any combination thereof. The administrator may also provide status or actions in relation to the user, such as making them active or inactive to permit or revoke access to the system according to embodiments described herein, and/or by deleting the user.

In an exemplary embodiment, as an optional feature, a user may create an alias user to correspond to a Windows 10/11 OIDC application. This enables Enter the Windows Profile name and computer name in the relevant fields. The email address used does not need to be an active account capable of receiving email.

Figure 9:
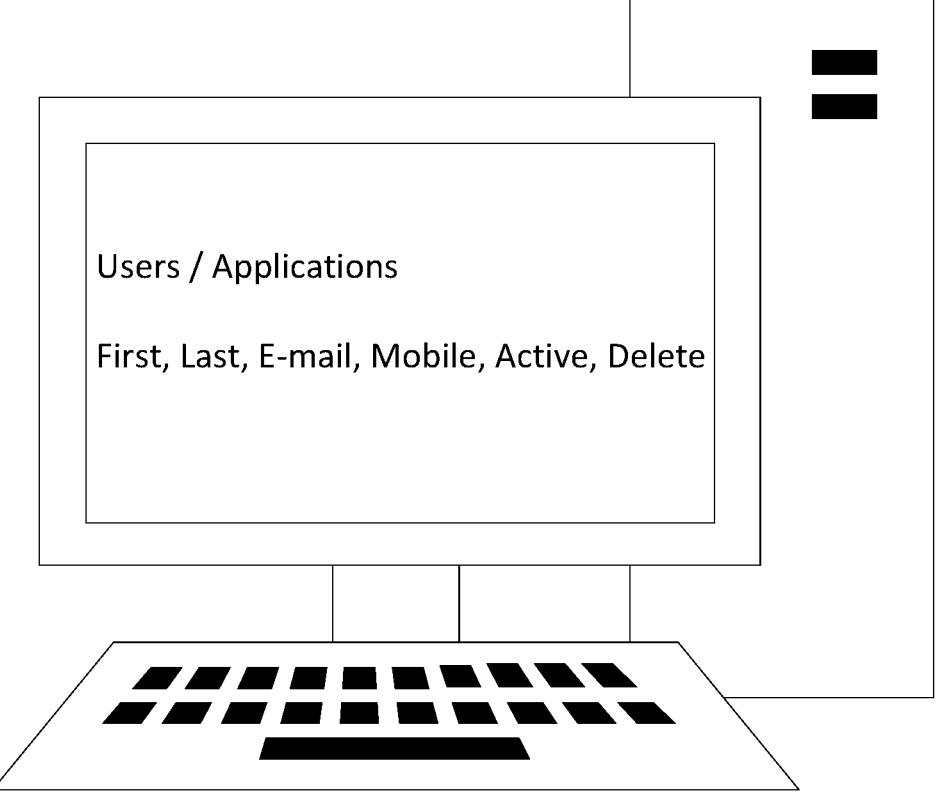

FIG. 9 illustrates an exemplary create user field in which data can be entered about a user. Exemplary information about a user may include, for example, the user first name, last name, email address, phone number, whether the user is active or inactive, the level of authentication such as multi-factor, triple factor, photo authentication, etc.

Figure 10:
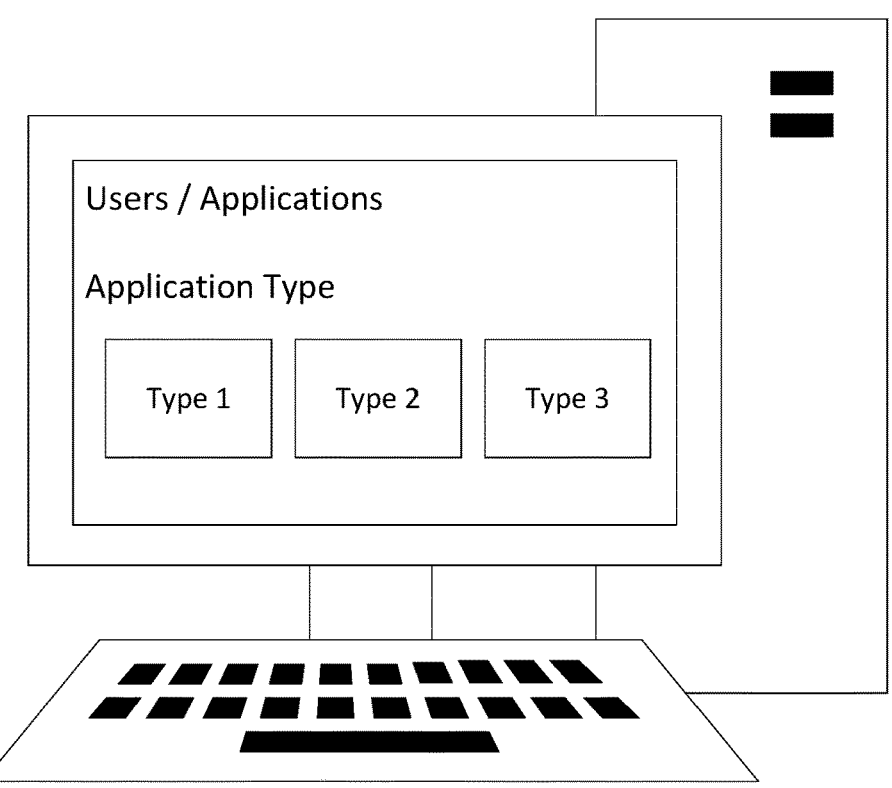

FIG. 10 illustrates an exemplary applications window that permits the administrator to see the various applications that are controlled by the authentication program. Exemplary applications may include SAML 2.0, OpenID Connect, OIDC—Windows Credential Provider, or other authentication program. The administrator can select OIDC—Windows Credential Provider from the available applications.

Figure 11:
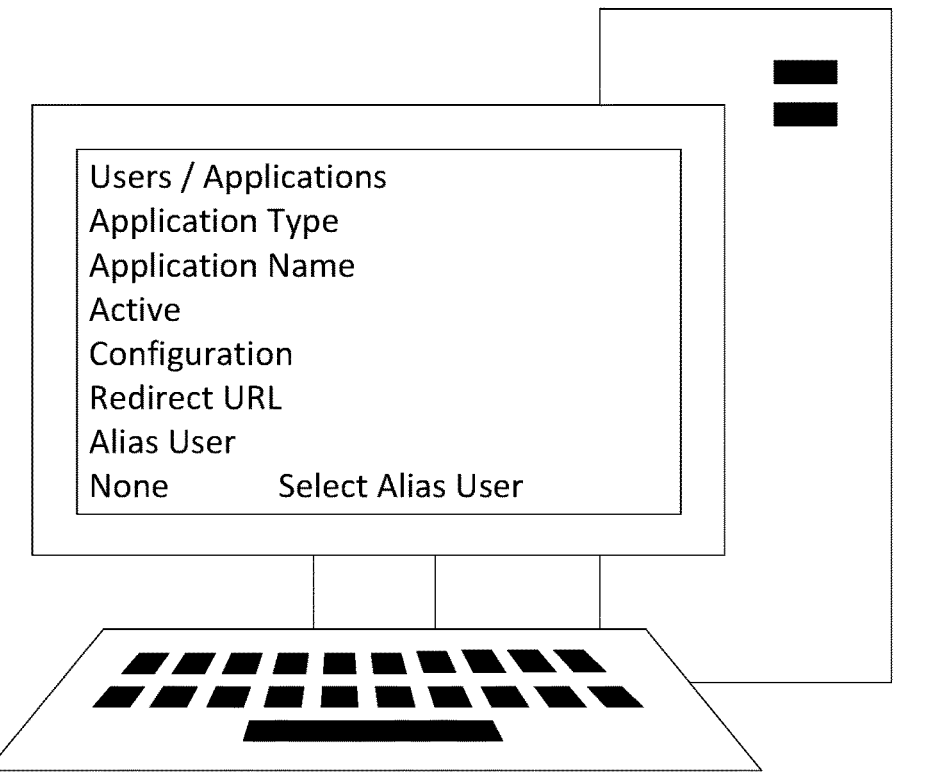

FIG. 11 illustrates an exemplary user interface providing a listing of application types for the selected application. For example, an administrator can select an application type of OIDC—Windows Credential Provider and select the alias user previously created to obtain information about the application and user including an application name, the current status, an address for directing communications (universal resource locator), whether the user has an alias, among other information.

Figure 12:
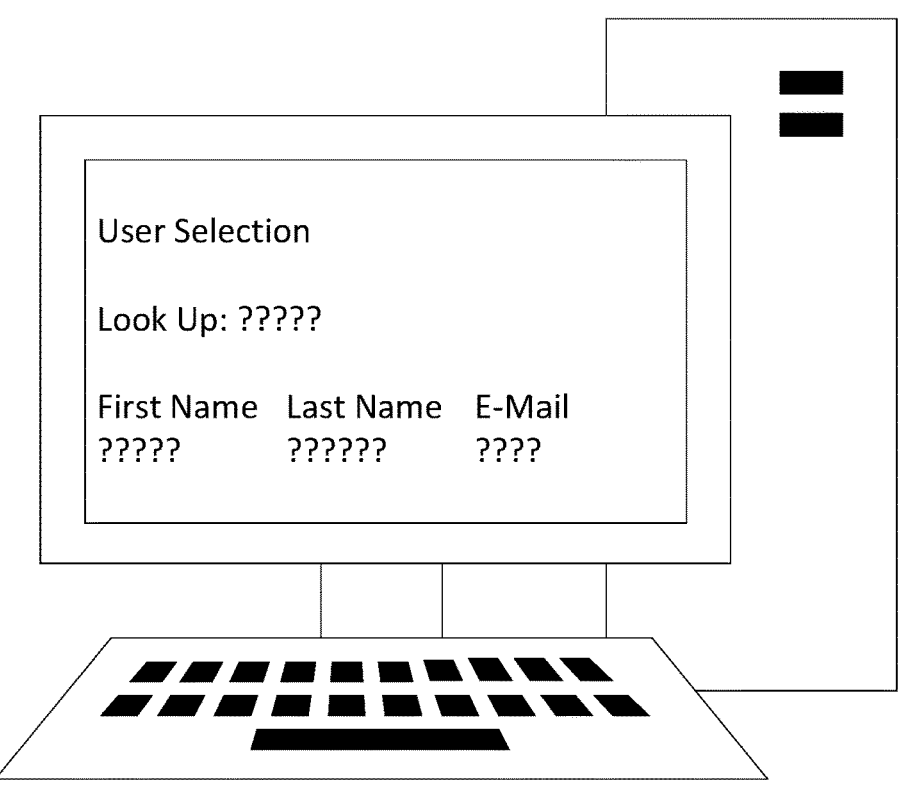

FIG. 12 illustrates an exemplary user interface that permits the administrator to look up a user and/or alias. The user may select alias or user from a screen and may run a search to find a specific user. The administrator may use the search for available users to become an alias user. The application may then be saved with the selected alias user.

Figure 13:
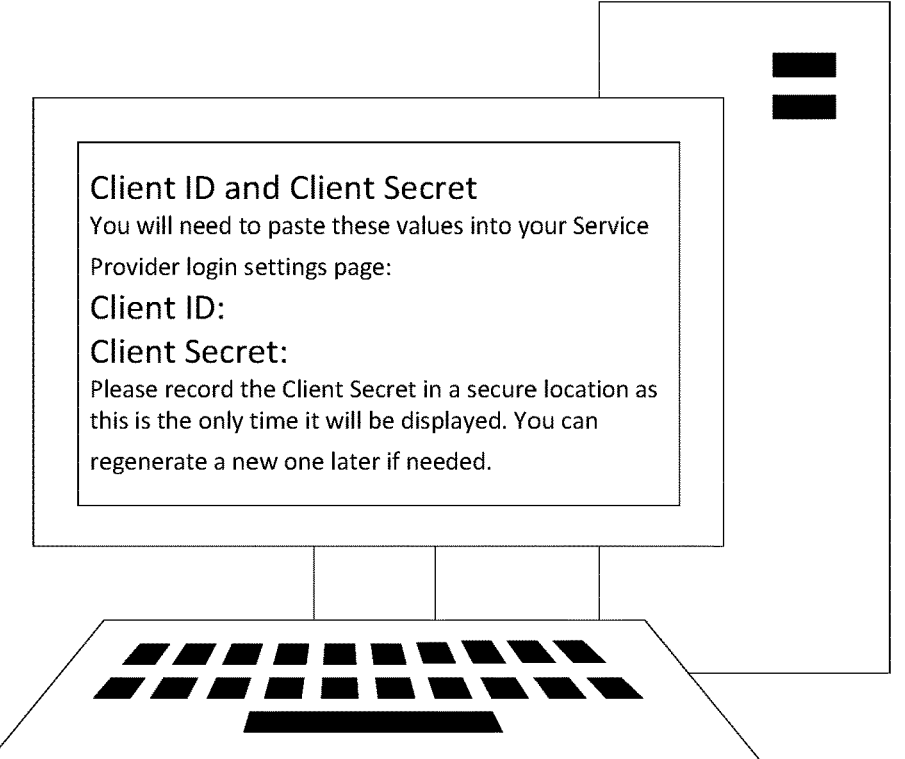

FIG. 13 illustrates an exemplary user interface for a client identifier and secret that may be displayed upon the creation of a user and application association. These can be used as application credentials.

Figure 14:
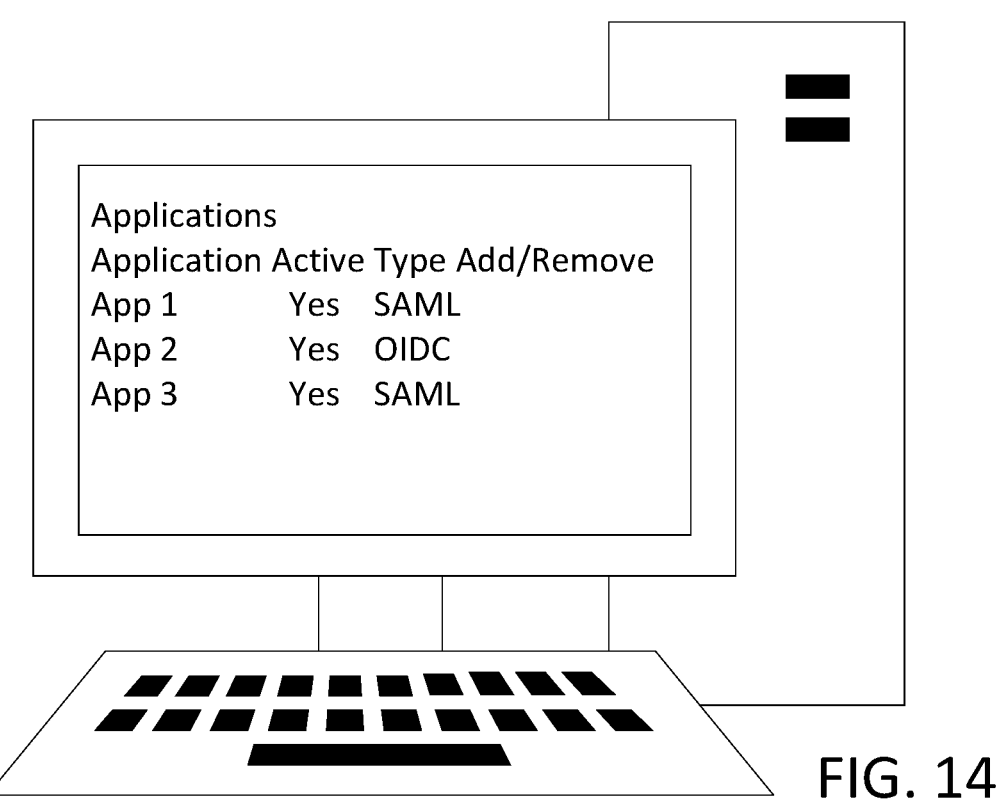

FIG. 14 illustrates an exemplary user interface after a series of applications have been added to the system. The various applications may be displayed along with information about their current status, such as whether they are active, and their type. Other information may also be provided such as if there is remote and/or direct access permitted to the program. The system may also display an option to add or remove users.

Figure 15:
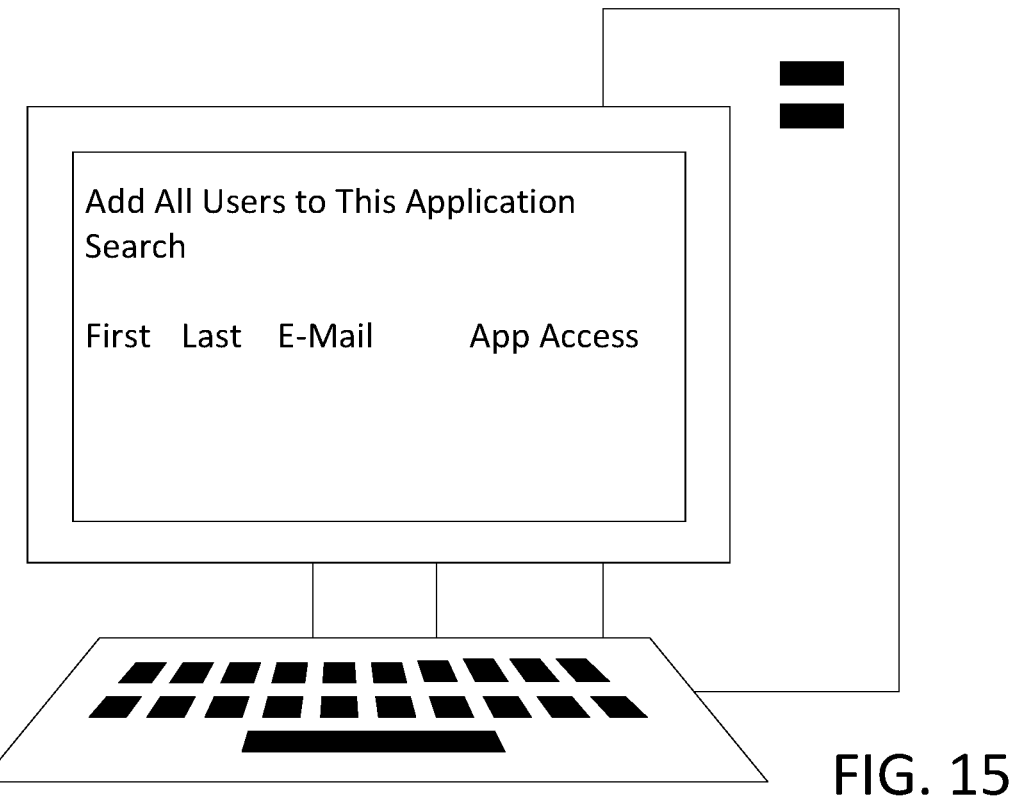

FIG. 15 illustrates an exemplary user interface once an administrator has selected to add a user to a given application from the interface of FIG. 14. An administrator may select to add users to an application. The system may then provide a user search interface as illustrated in FIG. 15. The administrator may search for and/or select the alias user. In an exemplary embodiment, all or a set of users may be displayed and the administrator may select a toggle for each of the users to indicate whether the individual user has access to the given application.

Figure 16:
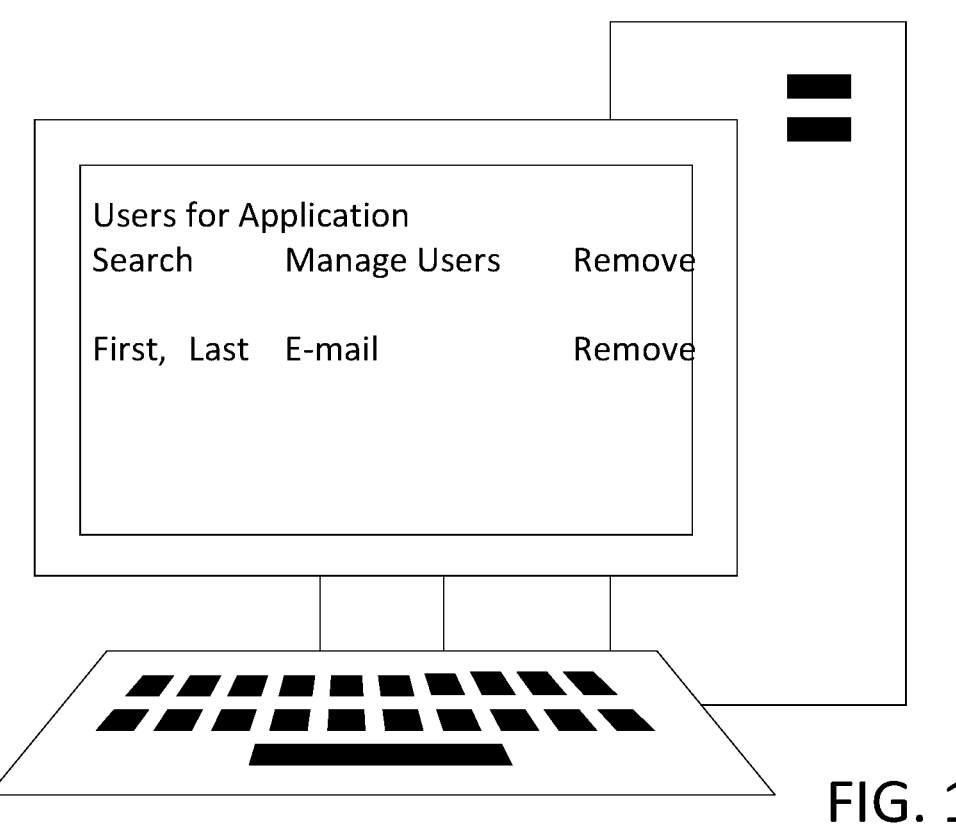

FIG. 16 illustrates an exemplary user interface in which select users are illustrated to grant access to an application. The user interface may show the users for a given application and/or may permit the administrator to remove the users from the application. The administrator may also be provided other manage user options.

After the applications and users are added to the system, an administrator may install the remote multifactor program on the machine to be accessed according to embodiments described herein. This may correspond to the credential provider application and/or the program installed and executed on the first device described herein. The first device is a Microsoft Windows operating system machine and therefore its display is the Windows display.

Figure 17:
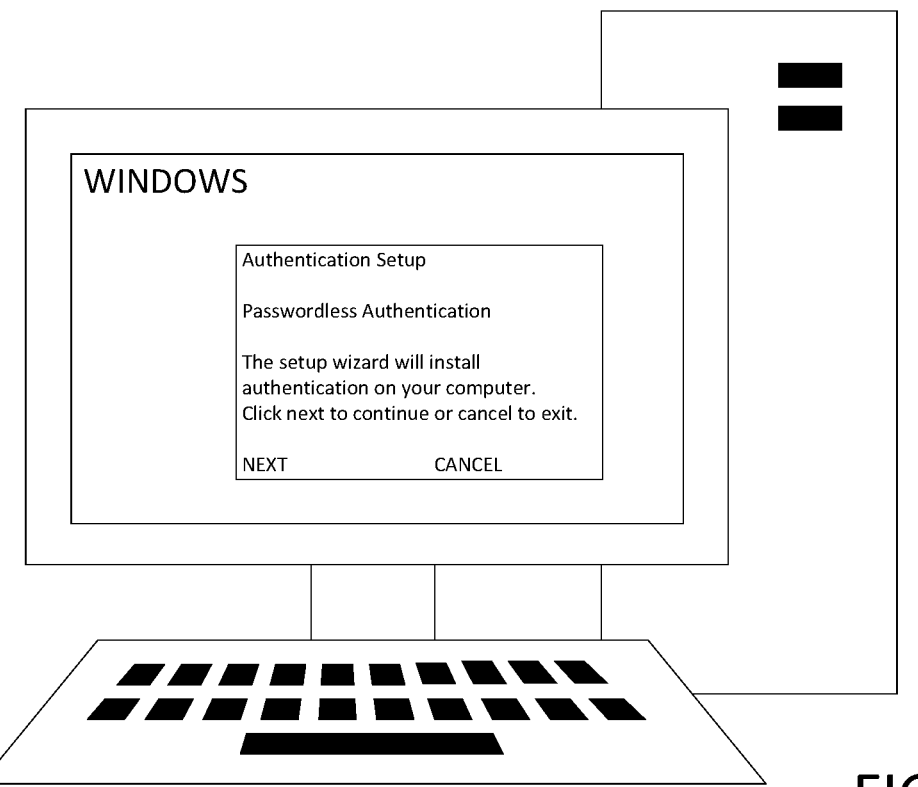

The administrator may therefore choose to download and install the credential provider application on the first device. FIG. 17 illustrates an exemplary user interface on the Windows device (the first device) after the installer is opened to install the credential provider application. The administrator may select next to continue the installation of the credential provider application on the first device.

Figure 18:
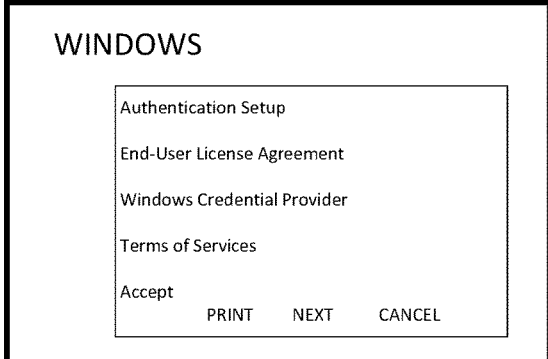

FIG. 18 and beyond illustrate the user interface as displayed on the screen without the peripheral devices (the first device or the second device) for ease of illustration. However, the user interfaces illustrated are intended to be displayed on a screen of a device to the user/administrator.

As illustrated in FIG. 18, when installing the credential provider onto the first device, the user may provided terms of service or other user agreement that the user must accept in order to proceed. The user may then read the end user license agreement, accept the terms, and proceed with the installation of the program on the first device.

Figure 19:
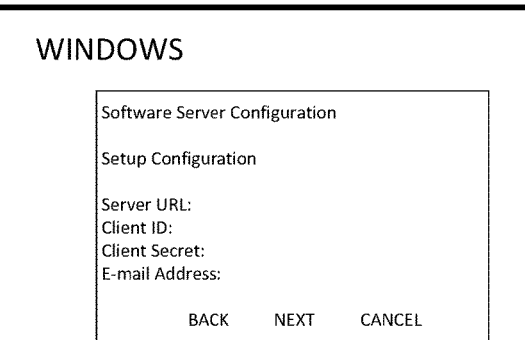

FIG. 19 illustrates information about the user that was provided during the administrator set up. The administrator may enter the Client Identifier and Client Secret as provided from the Administrator Console (see FIG. 13). Other user information such as email address of the alias user may also be provided. The user may then select to proceed.

In an exemplary embodiment, only one email address can be entered per installation. Additional users with unique email and passwords can be added by the edit config after installation. In this embodiment, a unique ID and password per user is provided, including the same user for admin or local user account. This requires that a single user with multi-user profiles have segmented accounts in the exemplary application according to embodiments described herein.

Figure 20:
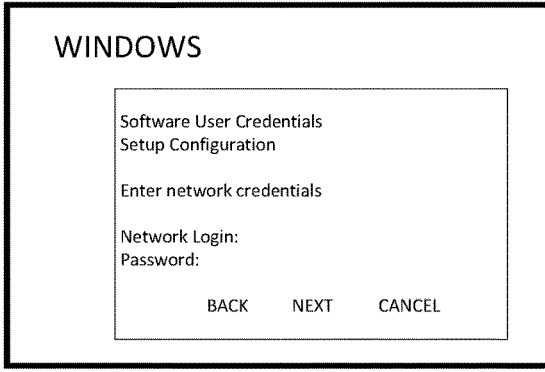

FIG. 20 illustrates a user interface for setting up user credentials. In this example, the system may populate the Domain/Username for the current account fields under network login. The user may then enter the password for this account. Alternatively, the user may enter both username and password, or the system may generate both user name and password.

Figure 21:
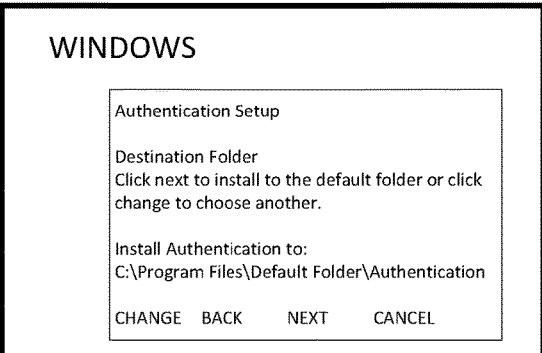
Figure 22:
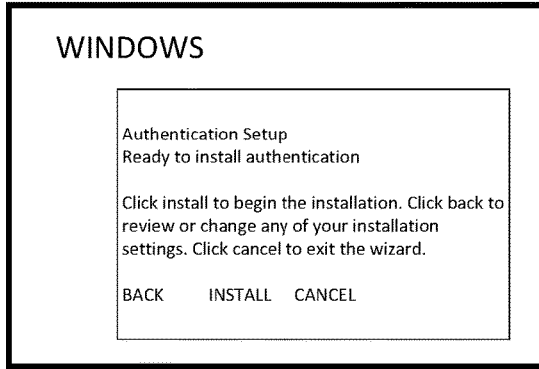
Figure 23:
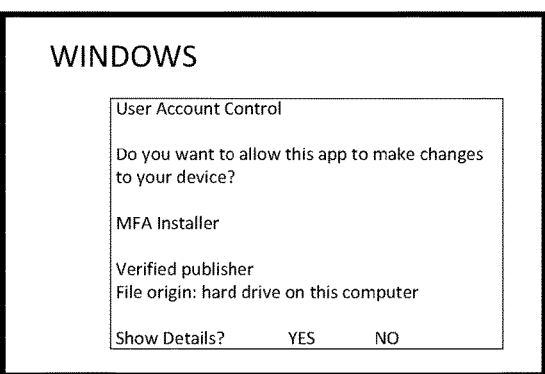

FIG. 21 illustrates an exemplary interface in which the user is prompted for an installation folder to save the program to at the first device. The user may then choose to install the program at the first device by selecting install as illustrated in FIG. 22. The installation process may provide additional selections to the user, such as requesting access to make changes to the first device as illustrated in FIG. 23. Once all information is provided, the installation process may begin. The status of the installation may be displayed to the user, such as illustrated in FIG. 24. For example, a status bar may be provided that indicates a progression of the installation process from initiated to complete. When the installation is complete, the user may select to finish the installation as illustrated in the user interface of FIG. 25.

Once installed on the first device, the credential provider may be launched on the first device. The credential provider may therefore be stored in memory and when executed by the processor of the first device by configured to display the user interfaces or communicate as described herein. Once the program is launched on the first device, a user interface may be provided, such as illustrated in FIG. 26 that permits the system to scan the configuration to confirm the settings of the program. Upon successful installation, the program on the first device may be configured. Once installed and configured, a user may now sign into the Windows Desktop with passwordless multifactor authentication according to embodiments described herein.

FIGS. 27-31 provider user interfaces as a user attempts to login into the first device (either directly or remotely) using a second device (FIGS. 28-31).

First, the user is presented with a user interface for logging into the first device. The user interface may be on the first device for direct user access or may be displayed on a third device from which a user is attempting to access the first device remotely. FIG. 27 illustrates the user interface for logging into the first device. The login provides the one time code for the user to be communicated to the second device as described herein. As described herein, the one time code is displayed as a QR code, however, other communication methods for providing the one time code from the first (or third) device to the second device are also encompassed herein. The display device (either the first device or third device) has already communicated with the authentication server through the first device to obtain the one time code. Therefore, the login only needs to display a login screen with the one time use code.

The user then goes into the second device, the personal device of the user and launches the application on the second device. The user may select a user account from the application. As described herein various accounts may be associated with different programs and/or users and/or may provide different levels of access to the same or different applications. The user may therefore have multiple accounts that the user may select in order to access one or more different machines and/or different programs. The user may select the account associated with the user, with the desired level of access associated with the account and user, for accessing the first device. FIG. 28 illustrates an exemplary list of accounts for a user to select from the user interface of the second device after the application on the second device is launched.

Once the account is selected, the user may be required to login or provide authentication to that account on the second device. As illustrated in FIG. 29, the account may require a biometric identification. Other identification or log in credentials may also or alternatively be required. Upon selection of the application associated with the user, the system will know the user details, the account details, the associated authentication server, etc. in which to make the appropriate communication connections and to send the requisite information to the correct location.

Once the user account is selected and authenticated at the second device, the application on the second device is opened to receive the one time code from the display device (either the first or third device). As illustrated in FIG. 30, a user interface is provided for a visual capture of the one time code from the display device may be taken with the camera of the second device. The user interface may include a capture square or target location to focus the image of the one time code. As illustrated, the one time code is in the form of a QR code that is taken as a picture by the second device using the camera and the application on the second device. After receiving the one time code, the second device automatically communicates with the authentication server, and the authentication server automatically communicates with the first device to permit access to the device by the user. The user may thereafter be permitted access. The user may receive confirmation of access on the second device as illustrated in FIG. 31 or may simply be provided access on the display device.

Exemplary embodiments described herein may permit various login options, such as limiting login options to the first device to a single credential provider, namely the multifactor authentication program installed on the first device as described herein and not the Windows authentication interface as provided by the operating system. The modification may be made by modifying the registration keys of the operating system.

A user may access the windows registry editor of the first device. The user may then navigate to the available authentication credential providers. For example, the user may navigate to the HKEY_LOCAL_MACHINE\SOFTWARE\Microsoft\ Windows\CurrentVersion\Authetnication\. The list of credential providers will then be provided. The CLSID for the desired credential provider according to embodiments described herein should be noted in order to use them in the Group Policy Editor section described herein. While keeping the registry editor open, the administrator can proceed to the group policy editor. The administrator can open the group policy editor. The administrator can use the registry editor. In the local group policy editor, the user can go to the computer configuration, administrative templates, system, and logon.

In the local group policy editor, the user can assign a default credential provider. The administrator can locate the setting to assign a default credential provider and select to edit. The administrator may add the CLSID for the credential provider as described above, to enable the credential provider. When finished, the administrator may apply the selection.

The administrator may also select to disable the password sign-in that is part of the conventional Microsoft Windows operating system. The administrator may select to exclude credential providers. The administrator may select to open and edit the setting option to exclude credential providers. The administrator may select enabled and input the CLSID from the Registry Editor step previously described for the credential provider. The user may apply and select the desired credential provider of the registry editor. After making the selection, the administrator should restart the first device to engage the settings.

After the administrator modifies the key registry, the first device enables the authentication method of the first device to the desired credential provider to perform the methods described herein, and may select that the credential provider by the sole authentication method to the machine, thereby disenabling the Microsoft credential, password and/or multiple factor authentication method of Microsoft.

Exemplary embodiments described herein may provide additional security for accessing a Microsoft Machine.

By installing embodiments of the multi-factor authentication system described herein for remote or direct access to a Windows machine protected by WindowsMFA, IT Administrators can facilitate stronger authentication standards for machine access, have an auditable log of when users sign into the machine and a consistent authentication method for desktop and web applications.

Using exemplary systems to employ the methods described herein that incorporate registry key modification, access to local and remote machines can be limited to a single credential provider that is installed to handle the specific remote authentication process or to other credential providers.

Exemplary embodiments of the system described herein can be based in software and/or hardware. While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

As used herein, the terms "about," "substantially," or "approximately" for any numerical values, ranges, shapes, distances, relative relationships, etc. indicate a suitable dimensional tolerance that allows the part or collection of components to function for its intended purpose as described herein. Numerical ranges may also be provided herein. Unless otherwise indicated, each range is intended to include the endpoints, and any quantity within the provided range. Therefore, a range of 2-4, includes 2, 3, 4, and any subdivision between 2 and 4, such as 2.1, 2.01, and 2.001. The range also encompasses any combination of ranges, such that 2-4 includes 2-3 and 3-4.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A process of remotely accessing a first device, comprising:

modifying the first device to display a one-time code using a credential provider associated with an authentication server that can authenticate a user or other device to the first device, wherein the modification to use the credential provider to display the one-time code is by modification of one or more registry keys of a Microsoft Windows operating system of the first device;

connecting the first device to the authentication server;

generating, with the credential provider, the one-time code that is displayed as a QR code on a login screen of a third device as an image of a login screen of the first device, wherein the first device is being remotely accessed from the third device;

accepting the one-time code at a second device using an application stored on the second device configured to accept a code;

transmitting the one-time code from the second device to the authentication server by the second device, the second device being able to read and process the information contained in the QR code;

receiving and verifying the one-time code with the authentication server from the second device and verifying the authentication of the user of the second device;

transmitting approval for authentication of the user by the authentication server to the first device; and upon receiving the approval for authentication, signing the user into the first device.

2. The process of claim 1 wherein the exclusive use of the credential provider to display the one-time code and authenticate the user account of the first device is set up by modification of the one or more registry keys of the Microsoft Windows operating system.

3. The process of claim 2 wherein an encrypted password is returned to the first device after verification of the one-time code and user authentication by the authentication server.

4. The process of claim 3 wherein authentication of the user includes unlocking a virtual smart card on the first device after an authentication response is returned by the authentication server to the first device.

5. The process of claim 4 wherein the unlocked virtual smart card is used to log into the first device.

6. The process of claim 4 wherein the one-time code is communicated from the third device to the second device through a wireless communication protocol.

* * * * *